(12) United States Patent
Carimati Di Carimate et al.

(10) Patent No.: US 8,567,866 B2
(45) Date of Patent: Oct. 29, 2013

(54) STROLLER SEAT POD

(76) Inventors: Ascanio Carimati Di Carimate, Los Angeles, CA (US); Andrew Serbinski, Annandale, NJ (US); Richard Wyant, Phillipsburg, NJ (US)

(*) Notice: Subject to any disclaimer, the term of this patent is extended or adjusted under 35 U.S.C. 154(b) by 319 days.

(21) Appl. No.: 12/927,803

(22) Filed: Nov. 24, 2010

(65) Prior Publication Data

US 2011/0309658 A1 Dec. 22, 2011

Related U.S. Application Data

(63) Continuation-in-part of application No. 12/922,284, filed on Jun. 18, 2010.

(51) Int. Cl.
| | |
|---|---|
| B60N 2/02 | (2006.01) |
| A47C 3/00 | (2006.01) |
| A47C 7/50 | (2006.01) |
| A47C 7/62 | (2006.01) |
| B60N 2/42 | (2006.01) |

(52) U.S. Cl.
USPC ............ 297/378.1; 297/353; 297/284.1; 297/423.26; 297/184.13; 297/487

(58) Field of Classification Search
USPC ............ 297/16.1, 353, 284.1, 378.1, 378.14, 297/487, 488, 423.26, 184.1, 184.13
See application file for complete search history.

(56) References Cited

U.S. PATENT DOCUMENTS

| | | | |
|---|---|---|---|
| 2,732,563 A * | 1/1956 | Shively | 4/450 |
| 3,679,223 A | 7/1972 | Sakai | |
| 3,679,257 A | 7/1972 | Jacuzzi et al. | |
| 4,527,829 A | 7/1985 | Fanslau et al. | |
| 4,763,911 A | 8/1988 | Gebhard | |
| 4,889,383 A * | 12/1989 | Jones | 297/16.1 |
| 5,221,106 A | 6/1993 | Shamie | |
| 5,395,154 A | 3/1995 | Wang | |
| 5,478,096 A | 12/1995 | Ting | |
| 6,343,805 B1 | 2/2002 | Roy | |
| 6,752,405 B1 | 6/2004 | Wright | |
| 6,840,577 B2 | 1/2005 | Watkins | |
| 7,516,966 B2 | 4/2009 | Gray | |
| 7,547,066 B2 | 6/2009 | Mendenhall | |
| 7,614,640 B2 | 11/2009 | Dean et al. | |
| 7,857,385 B2 * | 12/2010 | Zink et al. | 297/256 |
| 2003/0098604 A1 * | 5/2003 | Lan | 297/487 |
| 2006/0186719 A1 * | 8/2006 | Davis | 297/353 |
| 2007/0145792 A1 * | 6/2007 | Miller | 297/184.1 |
| 2008/0169697 A1 * | 7/2008 | Chen et al. | 297/487 |

* cited by examiner

Primary Examiner — Milton Nelson, Jr.
(74) Attorney, Agent, or Firm — Kenneth P. Glynn, Esq.; Deirdra M. Meagher, Esq.

(57) ABSTRACT

A stroller seat pod includes a seat bottom having front, left side, right side, back, top, and underside; seat back having first piece and second piece, first piece and second piece slidably connected to one another; first piece of seat back being hingedly connected to seat bottom such that seat back and seat bottom have first seat position and second seat position, wherein, in first seat position, seat back and seat bottom have open configuration for sitting, and wherein, in second seat position, seat back and seat bottom have a closed configuration for storage; second piece of seat back being connected to first piece of seat back such that first piece of seat back and second piece of seat back have first backrest position and second backrest position, wherein, in first backrest position, first piece of seat back and second piece of seat back are extended relative to one another to increase seat back area for sitting, wherein, in second backrest position, first piece of seat back and the second piece of seat back are retracted relative to one another for storage.

20 Claims, 21 Drawing Sheets

STROLLER SEAT POD

REFERENCE TO RELATED APPLICATIONS

The present application is a continuation-in-part of co-pending U.S. patent application Ser. No. 12/922,284 filed on Sep. 13, 2010 by the same inventors herein and entitled "STROLLER". Priority is also claimed for copending International Patent Application Serial Number PCT/US10/39199, filed on Jun. 18, 2010 by the same inventors herein and entitled "STROLLER".

BACKGROUND OF INVENTION a. Field of Invention

The invention relates generally to seats and particularly to foldable seats for infants and children of the type used in strollers, car seats, or any application related to foldable supports for infants and children, herein "seat pods". The present invention seat pod provides a compact and portable seat pod for children and infants.

b. Description of Related Art

The following patents are representative of the field pertaining to the present invention:

U.S. Pat. No. 7,614,640 to Dean et al. describes a stroller having a stroller frame supported by front and rear wheels. The frame includes a latch assembly that is movable between a locked and an unlocked position. When in the locked position, the latch assembly prevents the frame from being folded. When in the unlocked position, the latch assembly allows the frame to be folded. A cup holder is supported by the frame that can move between an extended and a retracted position. The cup holder automatically moves to the retracted position when the stroller is folded.

U.S. Pat. No. 7,547,066 to Mendenhall describes a juvenile vehicle seat which includes a seat base, a foldable headrest, and a foundation including a leg rest.

U.S. Pat. No. 7,516,966 to Gray describes a convertible dual stroller and methods therefore for seating at least two children side-by-side when fully expanded, a single child when partially expanded and partially collapsed, and which is fully collapsible for storage. A secondary stroller portion is fixedly secured with a primary stroller portion and the secondary stroller portion may be collapsed when the convertible dual stroller is partially expanded and partially collapsed to seat one child while the primary stroller portion supports and transports the secondary stroller portion while the secondary stroller portion is collapsed.

U.S. Pat. No. 6,840,577 to Watkins describes systems and techniques for a planar seating apparatus having a seat support in a first plane, a back support in a second plane and coupled to the seat support, and a plurality of side supports coupled to the back support. The plurality of side supports are adjustable and capable of folding, as is the back support, to provide a compact and easily transportable and storable device.

U.S. Pat. No. 6,752,405 to Wright describes a convertible twin/single seat stroller for providing a two-in-one stroller which can be expanded to carry two children and contracted to carry only one child. The convertible twin/single seat stroller includes a frame assembly including front leg members and rear leg members, and also including cross members interconnecting the front and rear leg members; and also includes a wheel assembly being mounted to the front and rear leg members; and further includes handle members being mounted to the frame assembly; and also includes seat members being supported upon the frame assembly; and further includes a coupler for converting and securing a twin seat stroller to a single seat stroller.

U.S. Pat. No. 6,343,805 to Roy describes a folding wheelchair which includes first and second spaced-apart posts. A rear wheel is rotatably mounted to each post. First and second spaced-apart side rails are pivotally connected with a respective post. First and second front legs are pivotally connected with a respective side rail having their lower ends extending downwardly. A front wheel is connected with each front leg. A side tensional support member is pivotally connected to each leg and to a respective post. To fold the seat together, the front ends of the side rails are pivoted toward an upper end of the post. To further save space, the rear wheels are rotatively connected to the post by a quick release pin arrangement allowing for their quick removal.

U.S. Pat. No. 5,478,096 to Ting describes a collapsible multi-use baby carriage having a structure transformable into a dining chair, a safety seat in a car, a cradle, and a bed, comprising a seat, a backrest pivotally connected with the seat to change the angle of the backrest against the seat, a U-shaped hand rest pivotally connected with the backrest to possibly alter its angle against the backrest and having two opposite side tubes possible to be shortened and a windable support plate provided between the two opposite side tubes and windable on a winding tubular shaft housed in a front tube of the hand rest and to be pulled out thereof for putting foods thereon, and two front and two rear casters pivotally connected with the bottom of the seat and foldable to the bottom of the seat.

U.S. Pat. No. 5,395,154 to Wang describes a foldable baby chair comprising a chair back, a chair seat pivotally connected to the chair back via a pivot assembly. The pivot assembly consists of a salient part, a recess part suitable for interfittingly engaging with the salient part, and a positioning assembly, allowing the chair back to be pivot relative to the chair seat and then positioned at a desired inclination by means of the positioning assembly. Substantially inverted U-shaped guard rails are separately connected to the chair back and the chair seat by means of pivot assemblies, so that the inverted U-shaped guard rails are allowed to pivot relative to the chair back or chair seat and can be positioned to different inclinations. Extensible and foldable handle, visor, and footrest can be pivotly connected to the chair back and chair seat, thereby allowing the baby chair to be otherwise used as a baby cart, carry-cot, carryall, suitcase, dining chair, rocking chair, etc. Moreover, the baby chair is provided with a multi-hole safety buckle assembly, which can be used in conjunction with a car seat to secure a baby to the car seat.

U.S. Pat. No. 5,221,106 to Shamie describes an umbrella stroller which includes two side frames, each having a main side tube and a rear side tube pivotally connected to the main side tube at an intermediate portion thereof; a bottom scissor frame foldably connecting the side frames together; two upwardly inclined support rods pivotally connected at rear ends thereof to lower ends of the rear side tubes, and pivotally secured to a lower end of a respective main side tube; a rear seat supporting assembly supporting a fabric seat between the pair of side frames and above the bottom scissor frame, the rear seat supporting assembly including two horizontal seat support bars, each hinged at a rear end thereof to an intermediate point of a rear side tube, and extending forwardly therefrom with a substantially horizontal orientation in the open configuration, a connecting bar pivotally connected between each horizontal seat support bar and the respective upwardly inclined support rod, and a back support; and a front seat supporting assembly for supporting a fabric seat between the pair of side frames, the front seat supporting assembly being provided in tandem with the rear seat supporting assembly; and the rear seat supporting assembly further including a hard seat rest connected between the horizontal seat support bars for providing a hard seat support for the rear seat supporting assembly.

U.S. Pat. No. 4,763,911 to Gebhard et al. describes a foldable baby carriage which is foldable to a compact, reduced volume configuration having a height and width essentially less than or equal to the height and width of the back member. In the folded configuration, two of the components, preferably the back member and rear wheels support, cooperate to form a shell which encloses the other two major components of the carriage, preferably the seat member and the front wheels support.

U.S. Pat. No. 4,527,829 to Fanslau et al. describes a wheel chair, especially for invalids, which is foldable in a vertical direction rather than horizontally to transform the chair into a very compact package. For this purpose all foldable components of the chair are equipped with journals having journal axes extending perpendicularly to a vertical central plane of symmetry of the chair. Further, the seat is vertically liftable and also horizontally guided on guide tracks (18) extending in parallel to the plane of symmetry of the chair. The guide tracks (18) are movable back and forth on guide rail sections (17) which are pivoted to the top of the support structure (4) of the chair. Hydraulic piston cylinder drives are connected to all chair components which are movable under a loaded condition with a person sitting in the chair. The chair seat is also divided so that the chair may be moved directly over a toilet seat, for example. By raising the chair seat sufficiently above the arm rests in the aisle of an aircraft or bus, a person may be transported directly to a passenger seat with the aid of the present chair.

U.S. Pat. No. 3,679,257 to Jacuzzi et al. describes a favorable three wheeled wheelchair with solid seat and back, the back being hinged for folding down upon the seat, while the side wheel and front wheel assemblies are hingedly secured for folding in under the seat, the entire wheel chair in its folded condition being of light weight and capable of storage in the trunk of a car.

U.S. Pat. No. 3,679,223 to Sakai describes a perambulator on wheels or baby carriage according to this invention in the form of a rectangular suitcase with a backrest and wheels which are retractable, thus making it easy to carry, the wheels extended or retracted being positively locked in a proper position.

SUMMARY OF THE INVENTION

The present invention stroller seat pod comprises: a seat bottom having a front, a left side, a right side, a back, a top, and an underside; a seat back having a first piece and a second piece, the first piece and the second piece slidably connected to one another; the first piece of the seat back being hingedly connected to the seat bottom such that the seat back and the seat bottom have a first seat position and a second seat position, wherein, in the first seat position, the seat back and the seat bottom have an open configuration for sitting, and wherein, in the second seat position, the seat back and the seat bottom have a closed configuration for storage; the second piece of the seat back being connected to the first piece of the seat back such that the first piece of the seat back and the second piece of the seat back have a first backrest position and a second backrest position, wherein, in the first backrest position, the first piece of the seat back and the second piece of the seat back are extended relative to one another to increase seat back area for sitting, wherein, in the second backrest position, the first piece of the seat back and the second piece of the seat back are retracted relative to one another for storage; and, at least one footrest depending from the seat bottom such that the at least one footrest and the seat bottom have a first footrest position and a second footrest position, wherein, in the first footrest position, the at least one footrest is extended away from the seat bottom for use as a footrest during sitting, wherein, in the second footrest position, the at least one footrest is retracted toward the seat bottom for storage.

In some preferred embodiments of the present invention stroller seat pod, the stroller seat pod further comprises a canopy removably connected to the second piece of the seat back.

In some preferred embodiments of the present invention stroller seat pod, the stroller seat pod further comprises a canopy retractably connected to the second piece of the seat back.

In some preferred embodiments of the present invention stroller seat pod, the stroller seat pod further comprises a safety bar hingedly connected to the seat bottom, the safety bar having a first safety bar position and a second safety bar position, wherein, in the first safety bar position, the safety bar is extended away from the seat bottom for restraint, and wherein, in the second safety bar position, the safety bar is retracted toward the seat bottom for storage.

In some preferred embodiments of the present invention stroller seat pod, the stroller seat pod further comprises a safety bar hingedly connected to the seat back, the safety bar having a first safety bar position and a second safety bar position, wherein, in the first safety bar position, the safety bar is extended away from the seat back for restraint, and wherein, in the second safety bar position, the safety bar is retracted toward the seat back for storage.

In some preferred embodiments of the present invention stroller seat pod, when the stroller seat pod is in the first seat position, the seat bottom and the seat back form an angle between 1 and 180 degrees.

In some preferred embodiments of the present invention stroller seat pod, the at least one footrest is functionally connected to the seat back, such that as the seat back and the seat bottom move from the first seat position to the second seat position, the at least one footrest and the seat bottom move from the first footrest position to the second footrest position.

In some preferred embodiments of the present invention stroller seat pod, the stroller seat pod further comprises a first locking mechanism adapted to hold the seat bottom and the seat back in either the first seat position or the second seat position; a second locking mechanism adapted to hold the first piece of the seat back and the second piece of the seat back in either the first backrest position or the second backrest position, and a third locking mechanism adapted to hold the at least one footrest and the seat bottom in either the first footrest position or the second footrest position.

In some preferred embodiments of the present invention stroller seat pod, the seat bottom in the second seat position has a top-view footprint, the top-view footprint of the seat bottom having an outer edge; the safety bar has a top-view footprint, the top-view footprint of the safety bar having an inner edge; and the inner edge of the top-view footprint of the safety bar extends beyond the outer edge of the top-view footprint of the seat bottom in the second seat position.

In some preferred embodiments of the present invention stroller seat pod, the seat back in the second seat position has a top-view footprint, the top-view footprint of the seat back having an outer edge; the safety bar has a top-view footprint, the top-view footprint of the safety bar having an inner edge; and the inner edge of the top-view footprint of the safety bar extends beyond the outer edge of the top-view footprint of the seat back in the second seat position.

In another embodiment of the present invention, a stroller seat pod comprises: a seat bottom having a front, a left side, a right side, a back, a top, and an underside; a seat back having a first piece and a second piece, the first piece and the second piece slidably connected to one another; the first piece of the seat back being hingedly connected to the seat bottom such that the seat back and the seat bottom have a first seat position and a second seat position, wherein, in the first seat position, the seat back and the seat bottom have an open configuration for sitting, and wherein, in the second seat position, the seat back and the seat bottom have a closed configuration for storage; the second piece of the seat back being connected to the first piece of the seat back such that the first piece of the seat back and the second piece of the seat back have a first backrest position and a second backrest position, wherein, in the first backrest position, the first piece of the seat back and the second piece of the seat back are extended relative to one another to increase seat back area for sitting, wherein, in the second backrest position, the first piece of the seat back and the second piece of the seat back are retracted relative to one another for storage; at least one footrest depending from the seat bottom such that the at least one footrest and the seat bottom have a first footrest position and a second footrest position, wherein, in the first footrest position, the at least one footrest is extended away from the seat bottom for use as a footrest during sitting, wherein, in the second footrest position, the at least one footrest is retracted toward the seat bottom for storage; and, a seat connector connected to the underside of the seat bottom.

In some preferred embodiments of the present invention stroller seat pod, the stroller seat pod further comprises a canopy removably connected to the second piece of the seat back.

In some preferred embodiments of the present invention stroller seat pod, the stroller seat pod further comprises a canopy retractably connected to the second piece of the seat back.

In some preferred embodiments of the present invention stroller seat pod, the stroller seat pod further comprises a safety bar hingedly connected to the seat bottom, the safety bar having a first safety bar position and a second safety bar position, wherein, in the first safety bar position, the safety bar is extended away from the seat bottom for restraint, and wherein, in the second safety bar position, the safety bar is retracted toward the seat bottom for storage.

In some preferred embodiments of the present invention stroller seat pod, the stroller seat pod further comprises a safety bar hingedly connected to the seat back, the safety bar having a first safety bar position and a second safety bar position, wherein, in the first safety bar position, the safety bar is extended away from the seat back for restraint, and wherein, in the second safety bar position, the safety bar is retracted toward the seat back for storage.

In some preferred embodiments of the present invention stroller seat pod, when the stroller seat pod is in the first seat position, the seat bottom and the seat back form an angle between 1 and 180 degrees.

In some preferred embodiments of the present invention stroller seat pod, the at least one footrest is functionally connected to the seat back, such that as the seat back and the seat bottom move from the first seat position to the second seat position, the at least one footrest and the seat bottom move from the first footrest position to the second footrest position.

In some preferred embodiments of the present invention stroller seat pod, the stroller seat pod further comprises a first locking mechanism adapted to hold the seat bottom and the seat back in either the first seat position or the second seat position; a second locking mechanism adapted to hold the first piece of the seat back and the second piece of the seat back in either the first backrest position or the second backrest position; and a third locking mechanism adapted to hold the at least one footrest and the seat bottom in either the first footrest position or the second footrest position.

In some preferred embodiments of the present invention stroller seat pod, the stroller seat pod further comprises a swivel plate attached to the seat connector, the swivel plate having a first swivel position and a second swivel position wherein, in the first swivel position, the seat connector is substantially perpendicular to the seat bottom, wherein in the second swivel position the seat connector is not substantially perpendicular to the seat bottom; a seat swivel surface on the underside of the seat bottom; a swivel plate surface attached to the swivel plate, the swivel plate surface shaped to closely engage the seat swivel surface; and a friction modifying surface applied to the swivel plate surface.

In some preferred embodiments of the present invention stroller seat pod, the stroller seat pod further comprises a locking mechanism, the locking mechanism adapted to releasably lock the swivel plate in a position relative to the seat bottom.

BRIEF DESCRIPTION OF THE DRAWINGS

The following detailed description, given by way of example, but not limitation, may best be understood in conjunction with the accompanying drawings, in which.

DETAILED DESCRIPTION OF THE EMBODIMENTS

The present invention relates generally to seats and particularly to foldable seats for infants and children of the type used in strollers, car seats, or any application related to foldable supports for infants and children. In addition, the present invention seat provides a compact and portable seat for children and infants.

The present invention seat pod includes at bottom having a front, a left side, a right side, a back, a top, and an underside. In an embodiment of the present invention, the seat back includes a first piece hingedly connected to the seat bottom and a second piece connected to the first piece. The second piece may extend from or retract into the first piece. The retraction of the second piece into the first piece may extend at various increments to accommodate different sized infants and children.

A unique feature of the present invention seat pod is a removable insert on the back of the seat pod which provides aesthetic customizations. The back of the seat pod, a canopy and fabrics on various other parts of the seat pod allow for the customizations.

Embodiments of the invention are described below with reference to the accompanying drawings which depict embodiments of a folding seat. However, the invention is not limited to the depicted embodiments and the details thereof, which are provided for purposes of illustration and not limitation.

The advantages of the present invention seat pod include folding of a stroller without seat removal due to the seat pod's compact size when closed. This feature includes the option of a full sized child's seat in a very compact-when-folded footprint. Moreover, the present invention seat pod is adaptable to various platforms such as strollers, booster seats, high chairs and the like. Another advantage is that double strollers sit flat and are stackable when closed. The seat pods are easy to remove from platforms and are easy to transport and store.

Figure 1:
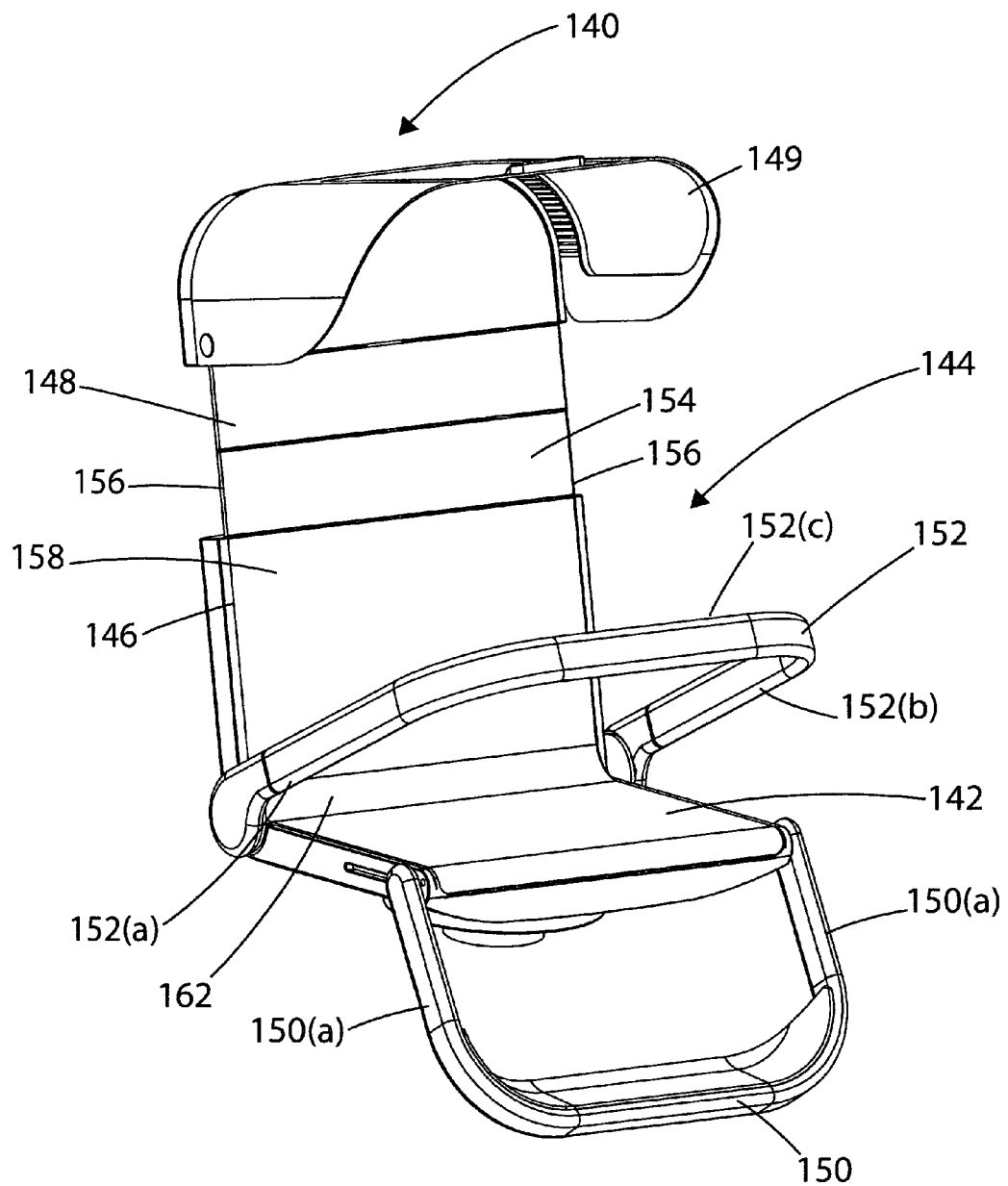
FIG. 1 is a perspective view of a fully opened seat pod in accordance with an embodiment of the present invention.
Figure 2:
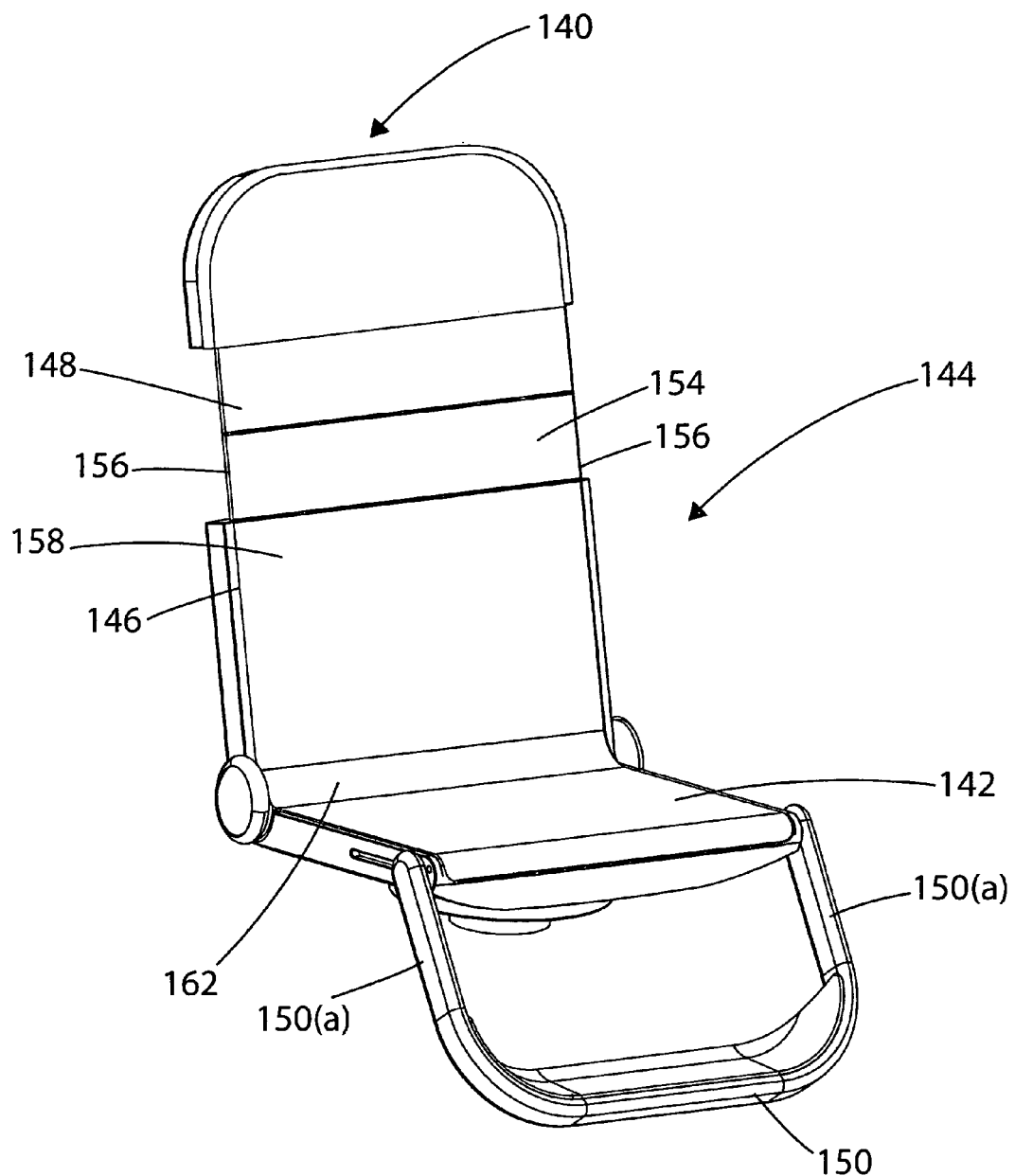
FIG. 2 is the same seat pod of FIG. 1, but with the canopy stored and the safety bar removed.
Figure 3:
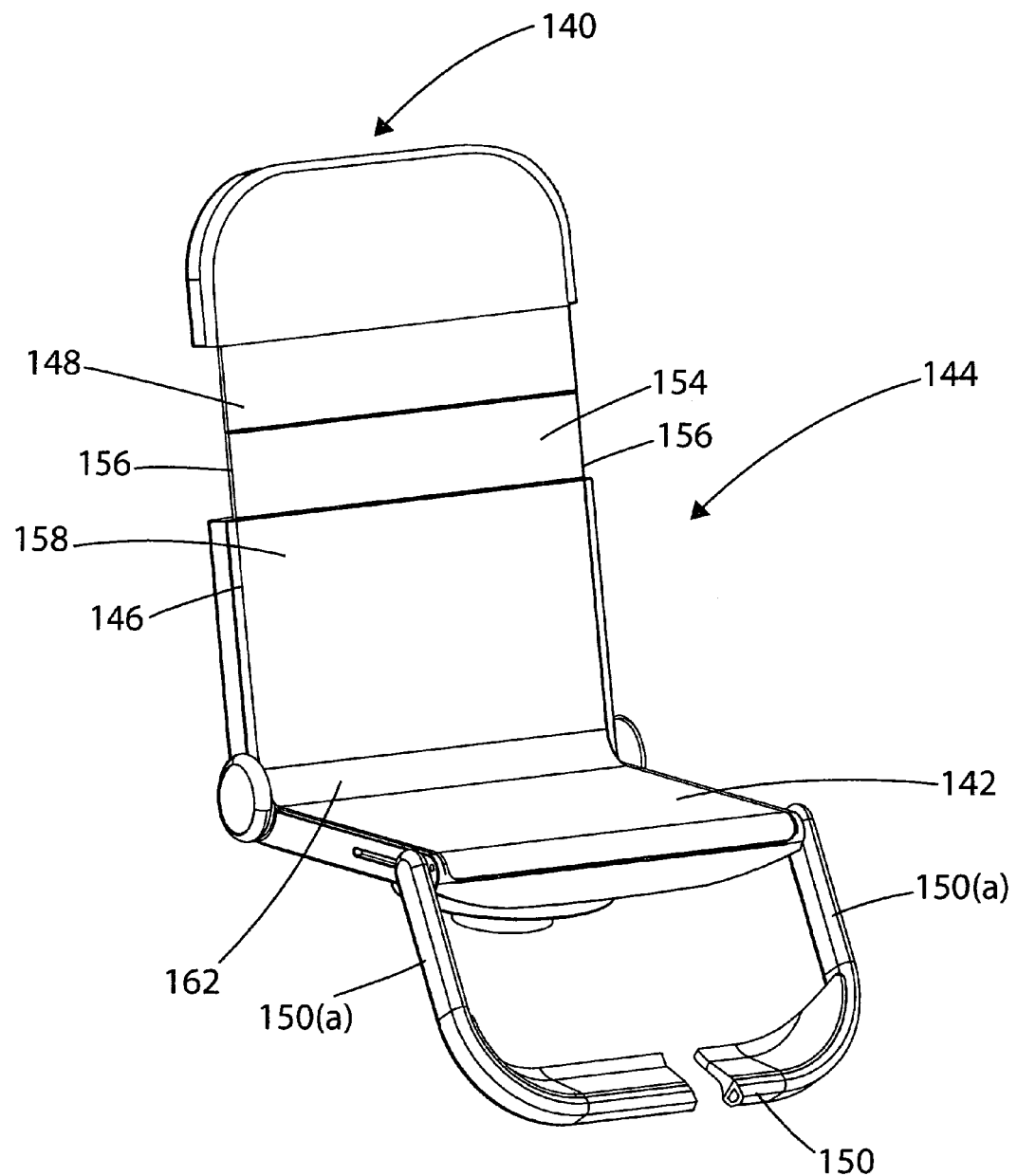
FIG. 3 illustrates the seat pod of FIG. 2 in a partially cut configuration.

FIGS. 1, 2 and 3 serve as an example of one embodiment of a seat pod according to this invention. FIG. 1 is a perspective view of a fully opened seat pod in accordance with an embodiment of the present invention. FIG. 2 is the same seat pod of FIG. 1, but with the canopy stored and the safety bar removed. FIG. 3 illustrates the seat pod of FIG. 2 in a partially cut configuration. These Figures are now discussed.

Present invention seat pod 140 includes a seat bottom 142, a seat back 144, a removable or retractable canopy 149, one or more footrests 150, and a safety belt or bar 152. In some embodiments, as here, the seat back 144 comprises two interconnected pieces, a backrest 146 and a headrest 148. The seat pod 140, headrest 148 may extend from or retract into backrest 146. As shown in FIGS. 1, 2 and 3 headrest 148 comprises a central portion 154 and tab portions 156. Backrest 146 comprises a center portion 158 sized and configured to accept central portion 154 of the headrest in sliding engagement. Tab portion 156 are sized and configured to be accepted into backrest slots 160 in a sliding engagement as shown in FIG. 2. Backrest slots 160 and headrest tabs 156 are shown in FIG. 2 on one side of the seat pod 140. The other side may comprise slots and tabs in a similar configuration adapted for a sliding engagement.

FIG. 2 represents an illustration of a seat pod 140 according to one embodiment of the present invention in an opened position, with the canopy (not shown) in the stored position and the safety bar 152 removed.

In FIG. 3, the footrest 150 is shown cut to illustrate one possible form of structure to establish both a rest and an outer edge hollow flexible fittage, as shown.

Referring specifically to FIG. 1, safety belt or bar 152 may be a rigid, semi-rigid, or flexible belt or bar as shown, for example, in FIG. 1 according to this disclosure. For ease of illustration only, safety bar 152 is shown as a rigid or semi-rigid structure formed of three generally linear sides 152(a), 152(b), and 152(c) joined to form three sides of a generally rectangular structure with sides 152(a) and 152(b) forming generally parallel opposite sides and side 152(c) connected to one end of each of the parallel sides. The other end of each parallel side is mounted for controlled, limited rotation to a portion of the seat pod 140. As shown in FIG. 1, sides 152(a) and 152(b) are rotatably attached to a connection point between seat bottom 142 and seat back 144, although one of skill in the art will recognize other mounting locations which may be appropriate. One of ordinary skill in the art would also recognize that the shape of safety bar 152 may be other than rectangular. Safety bar 152 may be, in non-limiting examples, semicircular, ovular, elliptical, or may assume any other shape that, when combined with the seat pod 140, forms an enclosed space generally defined by the three sides and at least part of the seat pod 140.

The seat pod 140 includes a separate seat bottom 142 and a seat back 144, alternatively, these components may be fabricated as one piece with a molded hinge (or living hinge) connecting the seat bottom 142 and the seat back 144. In some embodiments in which the seat pod 140 components are separate elements, the seat bottom 142 and the seat back 144 may be connected at a rotation means or pivot point or hinge 162. The hinge 162 may be a part separate from both the seat bottom 142 and the seat back 144, and fastened to the seat bottom 142 and the seat back 144 by any means known to the art according to some embodiments of the invention. Alternately, structures may be formed on the seat bottom 142 and the seat back 144 and when assembled together, with or without additional components, to form a hinge. In a non-limiting example, the edges of the seat bottom 142 and the seat back 144 to be pivotally engaged are formed with cooperating structures configured to mate with each other. In some embodiments, a passage may be provided in each structure such that, when the components are properly placed, the passages align to accept a pin or similar element through each structure, providing an axis of rotation. Alternately, the edge of one part of the seat to be engaged, for example the seat bottom 142, is provided with a first profile configured to be accepted into a second profile provided on the other part, for example the seat back. The first profile is configured for controlled rotation within the second profile. The resistance to rotation may be controlled, for example, by friction between the profiles, by bumps on one profile and detents on the other profile, by a ratchet mechanism, by releasable locking devices, by threaded components or other structures or techniques known to the art. The hinge 162 allows the seat back 144 to assume various angular positions with respect to the seat bottom 142.

Figure 4:
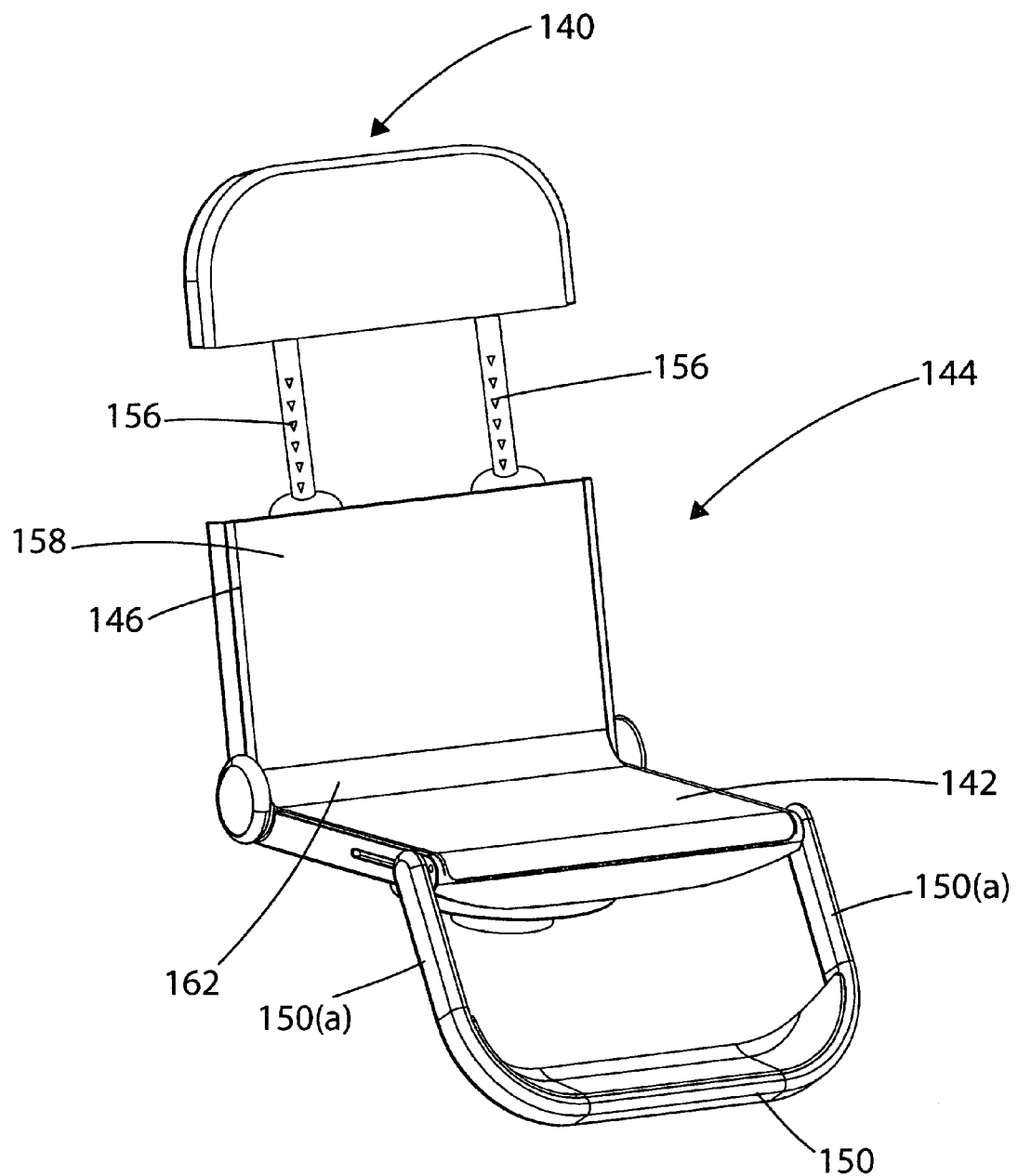
FIG. 4 is a present invention seat pod alternative embodiment showing a different, adjustable height interconnection between the back section and the headrest.

FIG. 4 is a present invention seat pod alternative embodiment showing a different, adjustable height interconnection between the back section, backrest 148 and the headrest and headrest tabs 156, which are shown here with ratchets that represent different friction lock positions, much like the headrest of an automobile seat.

Figure 5:
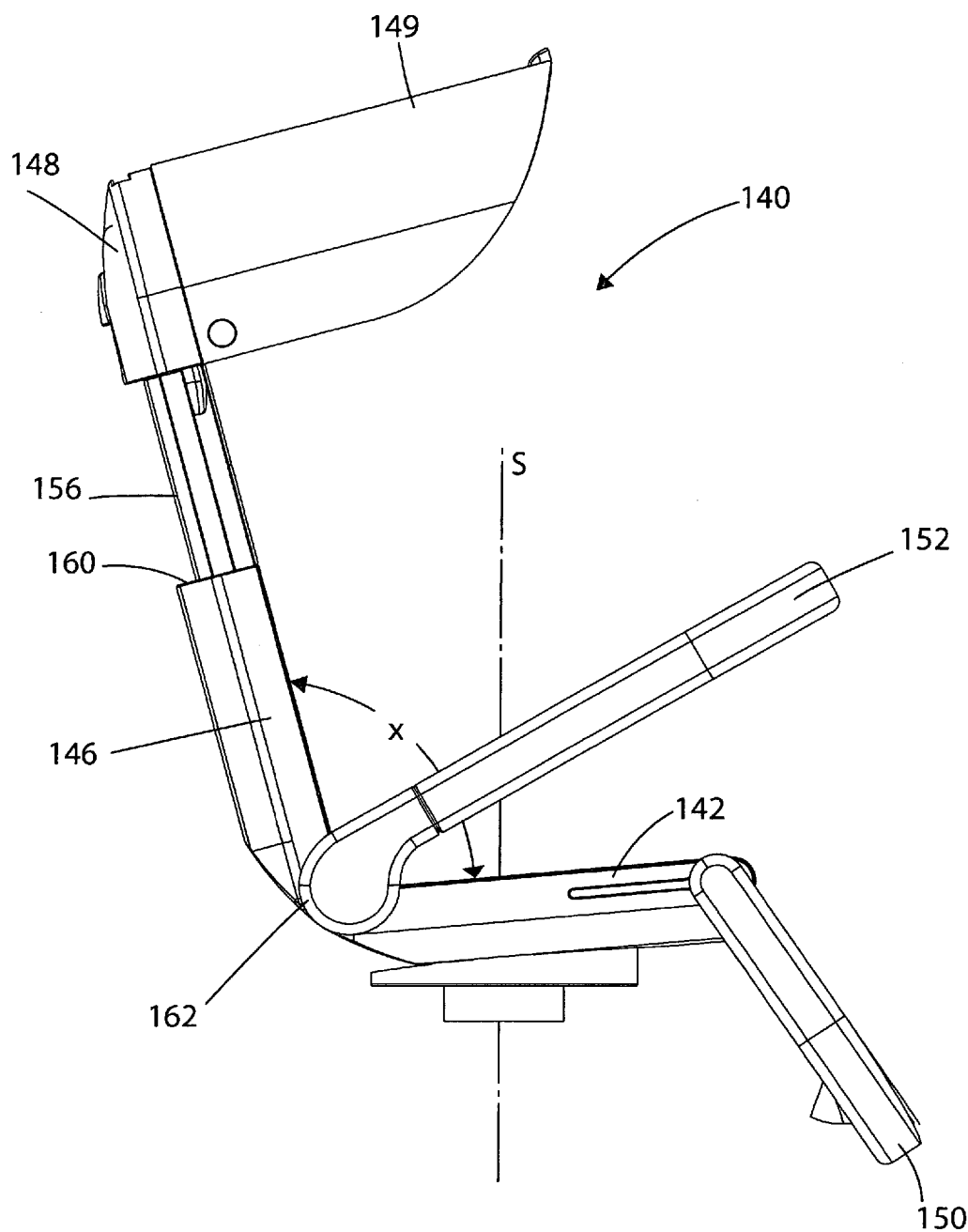
FIG. 5 is a side view of a fully opened seat pod of FIG. 1.

FIG. 5 illustrates a side view illustration of a seat pod 140 according to one embodiment of the present invention shown in FIGS. 1, 2 and 3, in an opened position. As illustrated, the seat back, comprising back rest 146 and head rest 148, forms seat back angle x with seat bottom 142. As illustrated in this Figure, the seat back 144 may be selectively rotated by an operator about hinge 162 to either increase angle x by rotating the seat back 144 counterclockwise, or decrease the angle by rotating seat back 144 clockwise, as desired. Once placed in the desired rotational position, a lock mechanism, not shown, may secure the seat back 144 from further rotation.

Figure 6:
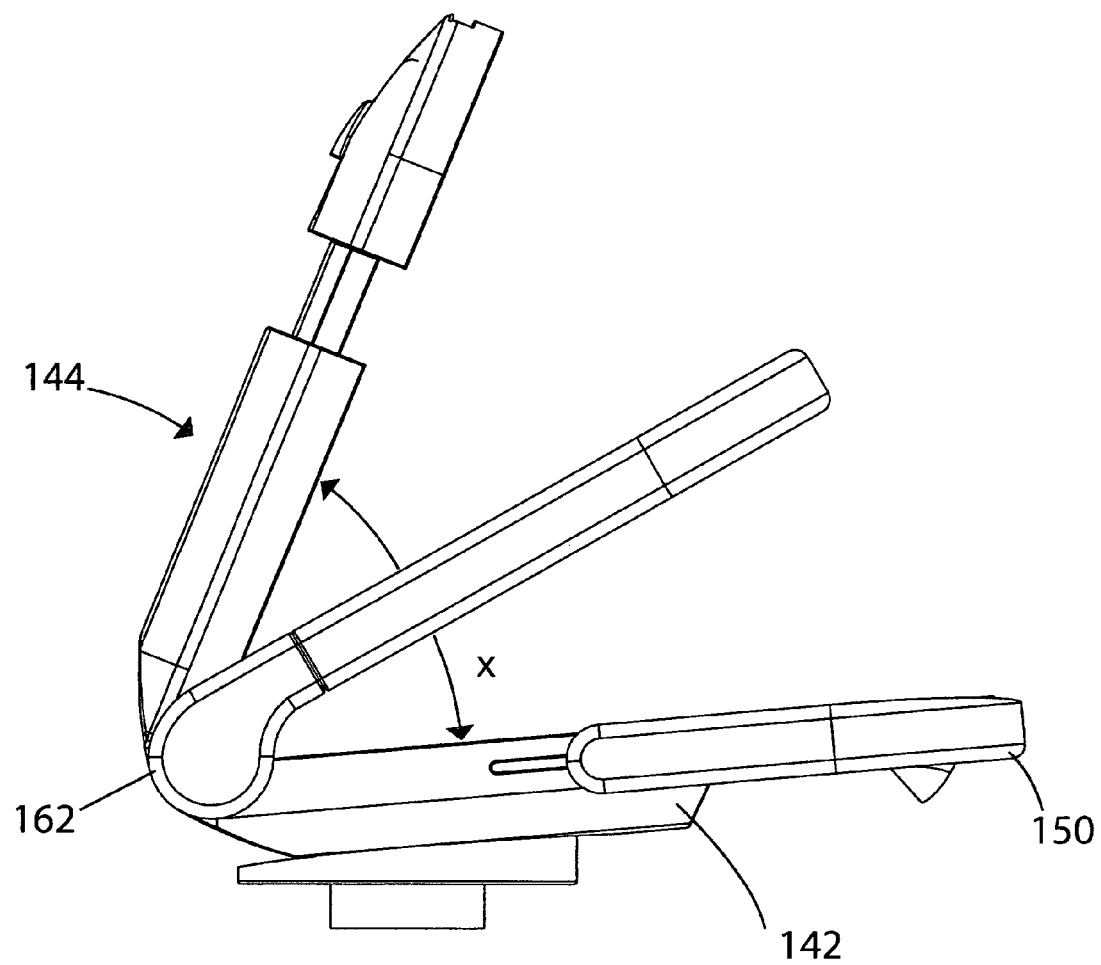
FIG. 6 illustrates the seat pod of FIG. 5 in a partially folded configuration.
Figure 7:
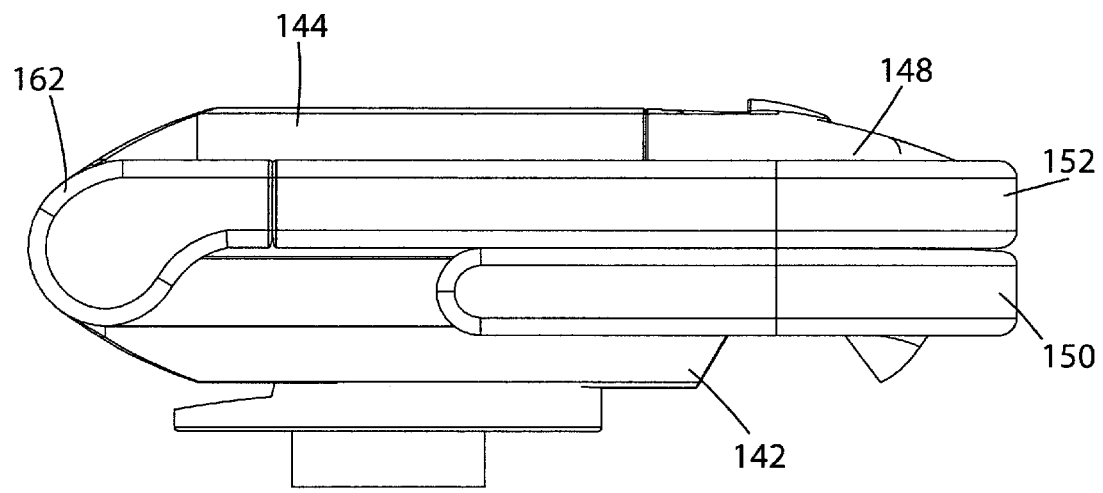
FIG. 7 is the seat pod of FIG. 6 in a fully folded configuration.

According to some embodiments, seat back angle x may range from substantially 180° to substantially 0° that is, from fully reclined to fully folded, respectively. The fully open position is shown in FIG. 5; the partially closed (or partially opened) position is shown in FIG. 6 and the fully folded position is illustrated in FIG. 7. To achieve a fully folded position according to some embodiments, head rest 148 may be at least partially retracted into back rest 146, thereby decreasing the length of seat back 144. According to some embodiments, the retracted head rest 148 facilitates placement of the seat back 144 within the enclosed space of safety bar 152.

One or more footrests 150 are positioned to slidably and rotatably depend from the front edge portion of the seat bottom 142 according to some embodiments of the present invention, the front edge portion being the edge opposite the hinge, or furthest away from the seat back 144. Footrest 150 may have a perimeter edge 150(*a*) (FIG. 1) at least partially defining a support structure configured to accept a child's foot placed heel first into the structure. In some embodiments, the footrest 150 may be a generally hollow, U-shaped structure. In some embodiments, the footrest, or footrests, 150 are functionally linked, directly or indirectly, to the seat back 140 such that when the seat back angle x decreases, as when the seat back 144 is folded to approach the seat bottom 142, the footrests are drawn towards the seat back 144 and aligned with the seat bottom 142. In some embodiments, when the seat back angle x approaches zero, the foot rest is completely drawn backward and adjacent to the seat bottom 142, as shown in FIG. 4. In other embodiments, the footrest may be adjustable through a telescoping action to accommodate different sized children.

Figure 8:
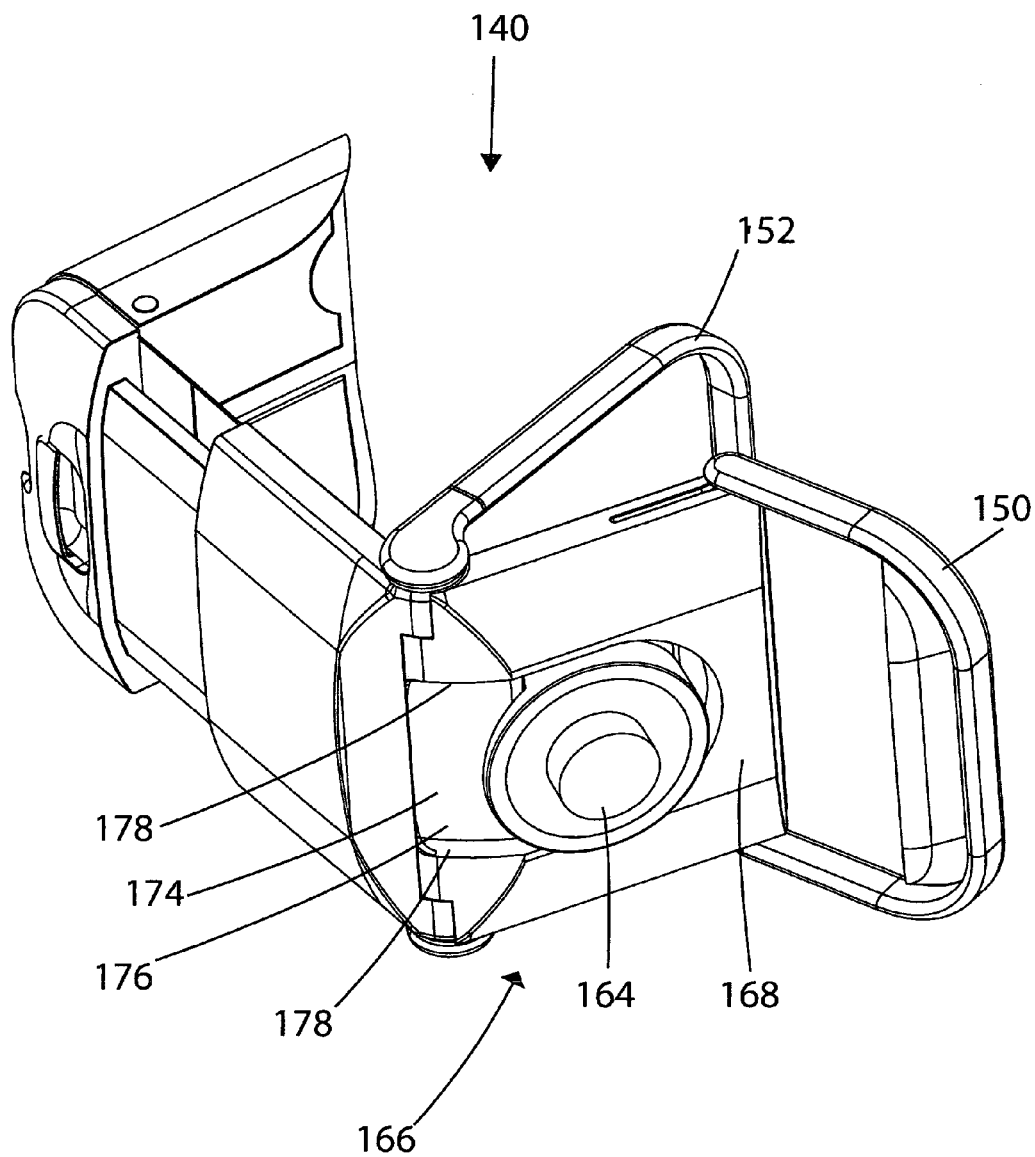
FIG. 8 is a perspective view of the underside of the seat pod of FIGS. 1 and 5.
Figure 9:
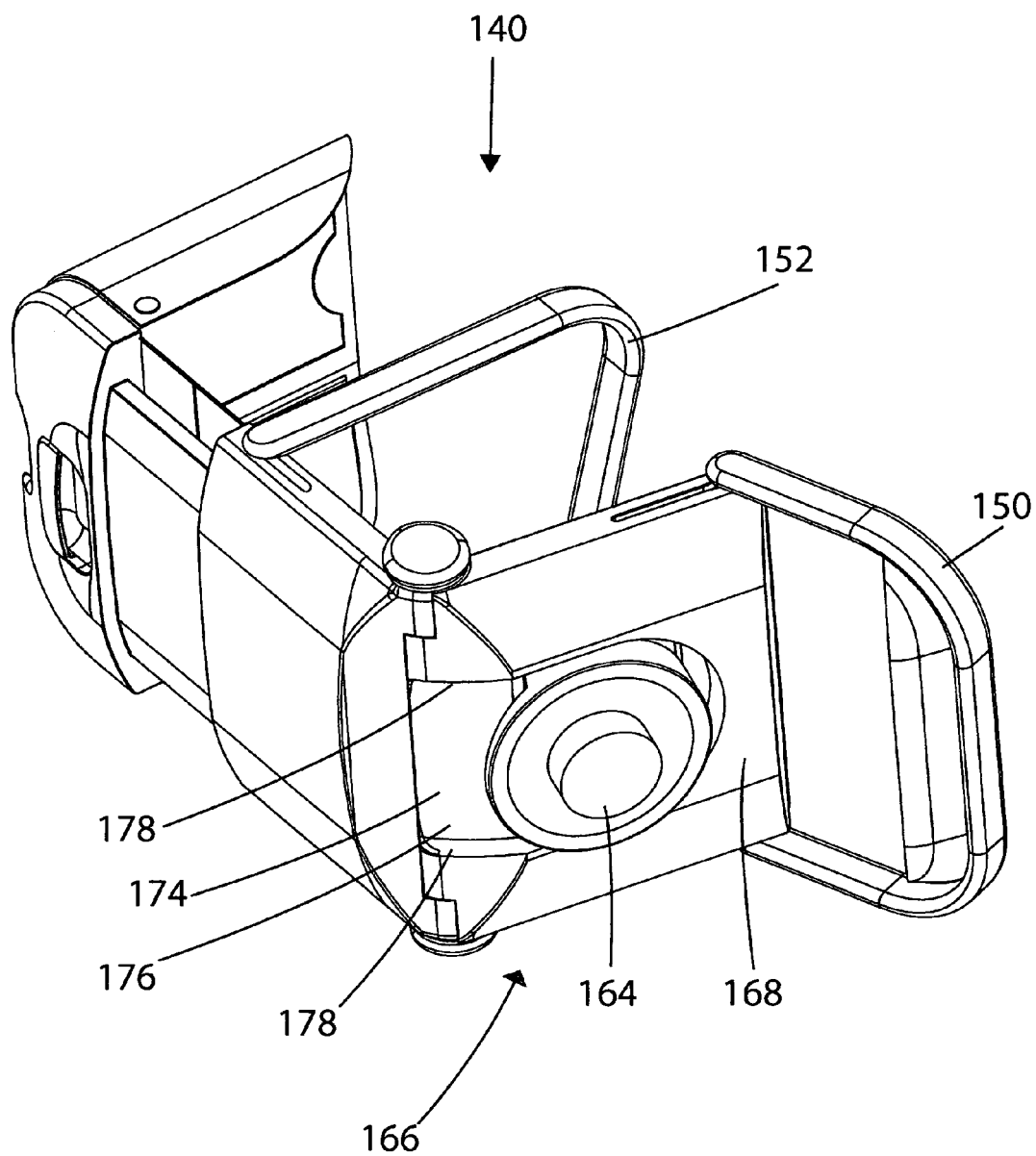
FIG. 9 is a perspective view of the seat pod of FIG. 8, but with the safety for position differently.

As illustrated in FIGS. 8 and 9, the underside of seat pod 140 according to some embodiments of the embodiments is provided with a seat connector 164 adapted to fit within and engage a space (not shown) in a seat support structure (not shown). FIGS. 8 and 9 are the same, except that they have different positions for the safety bar 152. According to the embodiment illustrated in FIG. 5, for example, seat connector 164 may be a cylindrical boss extending from the underside 166 of the seat pod 140, although one of ordinary skill in the art would recognize that other shapes may be suitable. The seat connector 164 as illustrated is sized to fit within a space (not shown) of the seat support structure (not shown) and may be supported for controllable rotation about an axis of the seat connector 164.

Seat connector 164 is configured to allow full 360° rotation about an axis of the seat support structure (not shown) according to embodiments of the present invention. A locking mechanism (not shown) may be provided in some embodiments to at least temporarily restrict rotation of the seat connector 164, and therefore the seat pod 140, about the seat support structure (not shown). In some embodiments, the locking mechanism may restrict rotation of the seat connector 164 at predetermined rotational positions. In other embodiments, the locking mechanism may restrict rotation of the seat connector 164 at any rotational position selected by the user or operator.

One of ordinary skill in the art will recognize that although FIGS. 8 and 9 illustrate the seat connector 164 as a cylindrical boss extending from the underside of the seat, adapted to fit within a space (not shown) in a seat support structure (not shown), the locations of the boss and space may be changed without affecting the function of the elements. For instance, the underside of the seat pod 140 may be provided with a cavity, while the seat support structure (not shown) may have a boss extending therefrom, similar to the seat connector 164. Functional and design benefits may be realized from either configuration. Design consideration may influence the choice of configuration.

Figure 10:
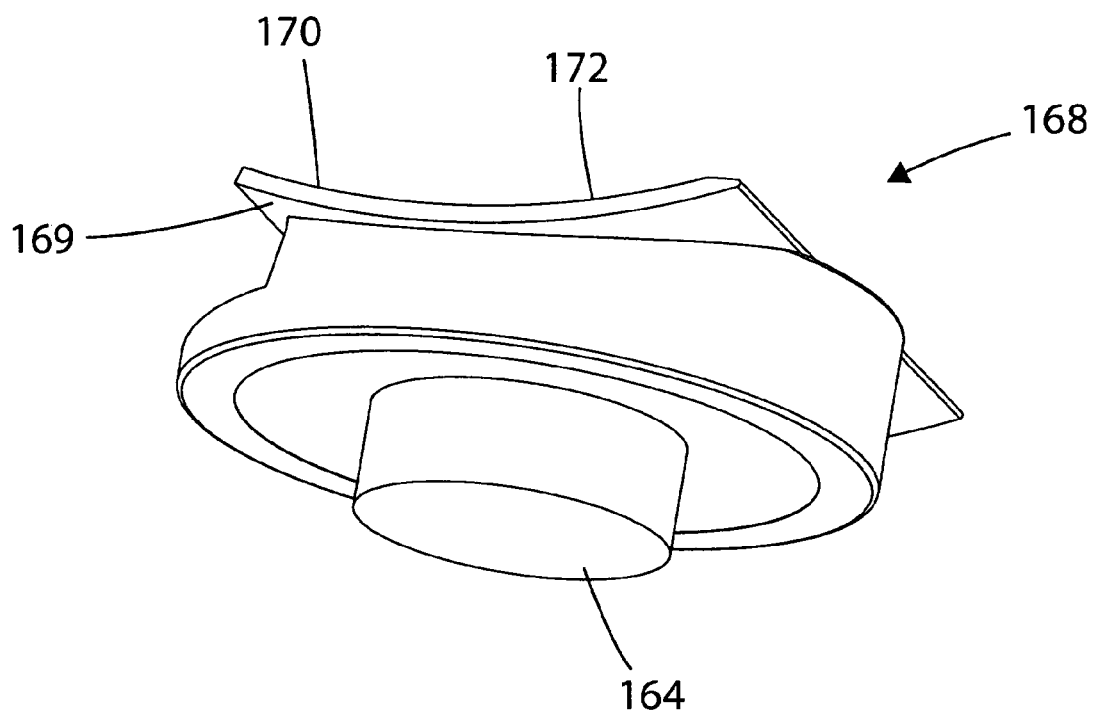
FIG. 10 is a perspective view of the swivel plate according to an embodiment of the invention.

According to at least the embodiment shown in FIGS. 8 and 9, seat connector 164 is connected to, or formed with, swivel plate 168, as shown more clearly in FIG. 10. Swivel plate 168 may include a swivel plate surface 170 shaped to closely engage at least a portion of the underside 166 of the seat pod 140 along a swivel seat surface 174. Swivel plate surface 170 may have a friction modifying surface 172 applied thereto. By way of non-limiting examples, the friction modifying surface 172 may be in the form of a coating, film, sheet, plate, laminate, spray, paste, liquid film, surface treatment, surface modification, or an application of any friction modifying material in the form of a solid, semi-solid, or liquid, applied to the swivel plate surface 170 to modify the frictional characteristics of at least the interface between the swivel plate surface 170 and the seat swivel surface 174. The friction modifying surface 172 may comprise one or more materials in one or more forms as generally known to the art. A friction modifying surface may be applied to the seat swivel surface 174 instead of, or in addition to, applying the friction modifying surface 172 to swivel plate surface 170. In embodiments where a friction modifying surface is applied to the seat swivel surface 174 and the swivel plate surface 170, the friction modifying surfaces may be the same or may be different from one another in composition or form.

Swivel plate 168 may be retained within swivel seat cavity 176 formed at least partially by seat swivel surface 174 and side walls 178 according to some embodiments of the invention. The seat swivel cavity 176 may be formed in the underside 166 of the seat bottom 142, the seat back 144, or in both the seat bottom 142 and the seat back 144. In some embodiments, at least side walls 178 of cavity 176 may be configured to allow controlled sliding of swivel plate 168 with seat swivel cavity 176. One or more side walls 178 of cavity 176 may be formed with a structure to engage at least a portion of swivel plate lip 169. The engagement urges swivel plate surface 170 into contact with seat swivel surface 174 and constrains sliding movement. Although a lip and an engagement surface are specifically disclosed, many other configurations may be suitable as recognized by one of ordinary skill in the art.

Alternately, but functionally similar to the embodiment described above, seat swivel surface 174 may be formed on the underside 166 of the seat bottom 142, the seat back 144, or both, and projections (not shown) may extend from the seat bottom 142 and/or the seat back 144 to engage swivel lip plate 169 for controlled sliding of swivel plate 168 on seat swivel surface 174. The projections may function as the side walls 178 of cavity 176 in the embodiment above. Additional elements, such as projections in a non-limiting example, may be present to further limit the travel of the swivel plate 168.

Swivel plate surface 170, seat swivel surface 174, and cavity side walls 178 may cooperate in some embodiments to allow seat pod 140 to swivel into a reclined position independent of and without altering, the relative position of the seat bottom 142 and the seat back 144 with respect to each other. That is, the angular measure x is independent, and may remain constant, as the seat pod 140 swivels into a reclined position.

Swivel plate surface 170 and seat swivel surface 174 may be comprised of linear, curvilinear, or linear and curvilinear segments to provide the desired path for the seat as the seat swivel surface 174 moves over the swivel plate surface 170. Friction modifying surface 172 may conform to the underlying surface of either the swivel plate surface 170 or the seat swivel surface 174. Alternately, the friction modifying surface may differ from the underlying profile. In some embodiments, at least a portion of the friction modifying surface 172 is comprised of the required linear, curvilinear, or linear and curvilinear segments to provide the desired path for the seat as the seat swivel surface 174 moves over the swivel plate surface 170.

In some embodiments, at least one seat pod 140 having a seat connector 164 is mounted to seat support structure 126. Seat connector 164 may be placed within a space (not shown) of a seat support structure (not shown) and supported for controlled and selectable rotation about a seat axis. Rotation of the seat is controlled in that user intervention is necessary to rotate the seat about the seat axis. Rotation is selectable in some embodiments in that a locking device (not shown) may be provided to at least temporarily fix the rotational position of the seat pod 140 about the seat axis. The locking device may, in a non-limiting example, arrest rotation of the seat at preselected rotational positions. Further rotation may be prevented by the locking device until some purposeful action is taken to release the seat pod 140 for rotation until the next preselected position is reached. In other embodiments, the locking device may, upon disengaging the device, allow rotation of the seat about the seat axis until a user selected position is reached at which point the seat pod 140 may be fixed in that position. Other methods of temporarily arresting/allowing rotation of the seat would be obvious to the artisan and would be within the scope and spirit of the invention.

Figure 11:
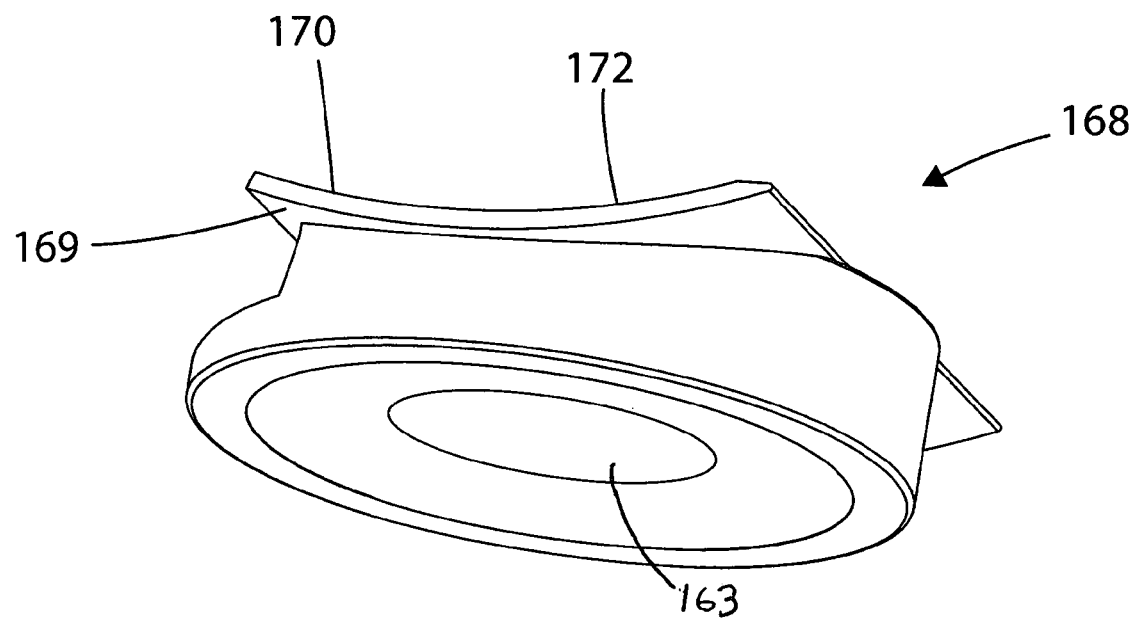
FIG. 11 is a perspective view of an alternative swivel plate according to an embodiment of the present invention.

FIG. 11 is a perspective view of an alternative swivel plate according to an embodiment of the present invention. It is the same as that shown in FIG. 10, except that it has a female receiver type seat connector 163 instead of a male seat connector. This female receiver type connector may take any shape or configuration consistent with the foregoing discussion.

Figure 12:
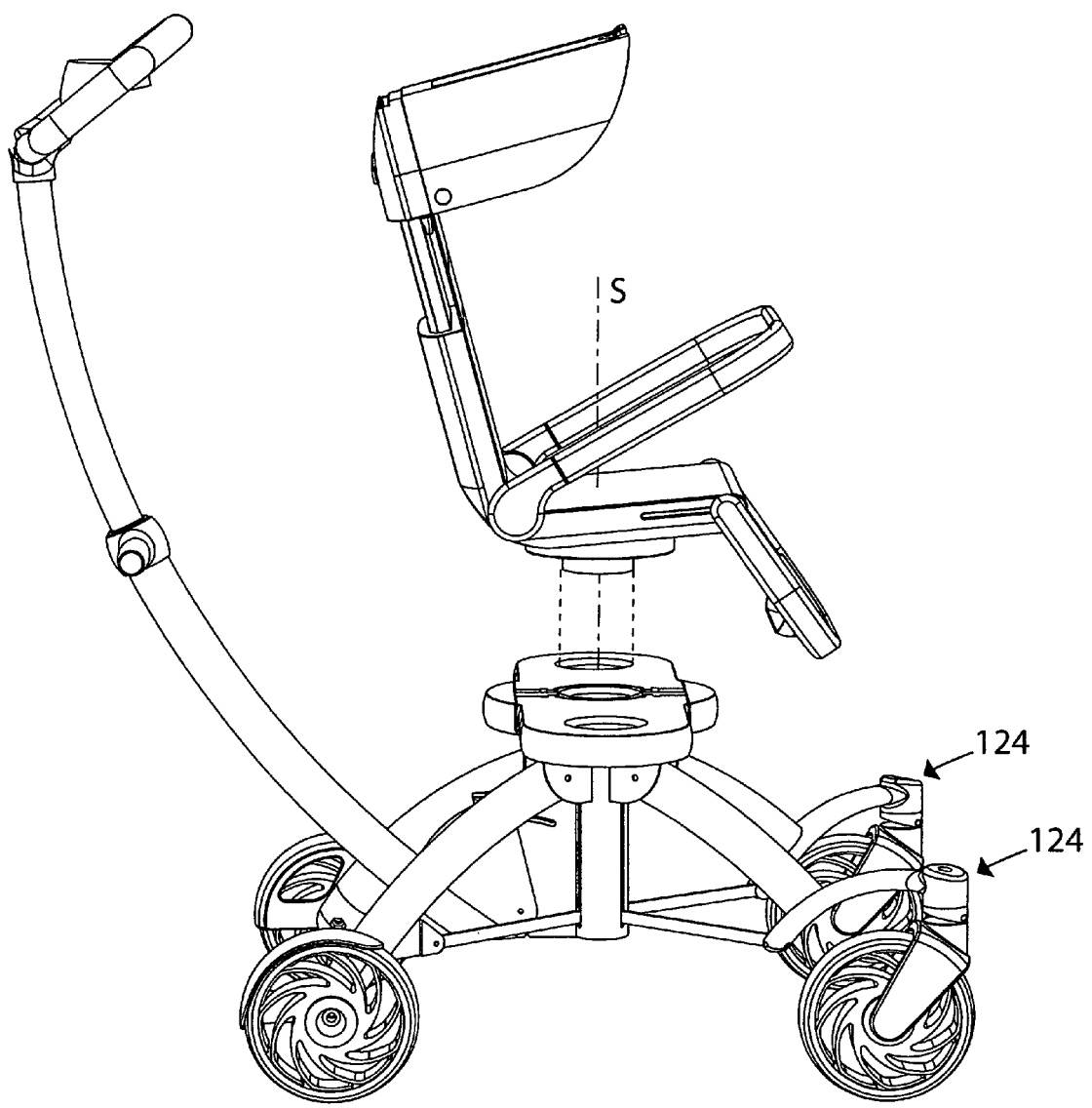
FIG. 12 is a perspective view of a stroller frame and the present invention seat pod of FIGS. 1 and 5, aligned for assembly.
Figure 13:
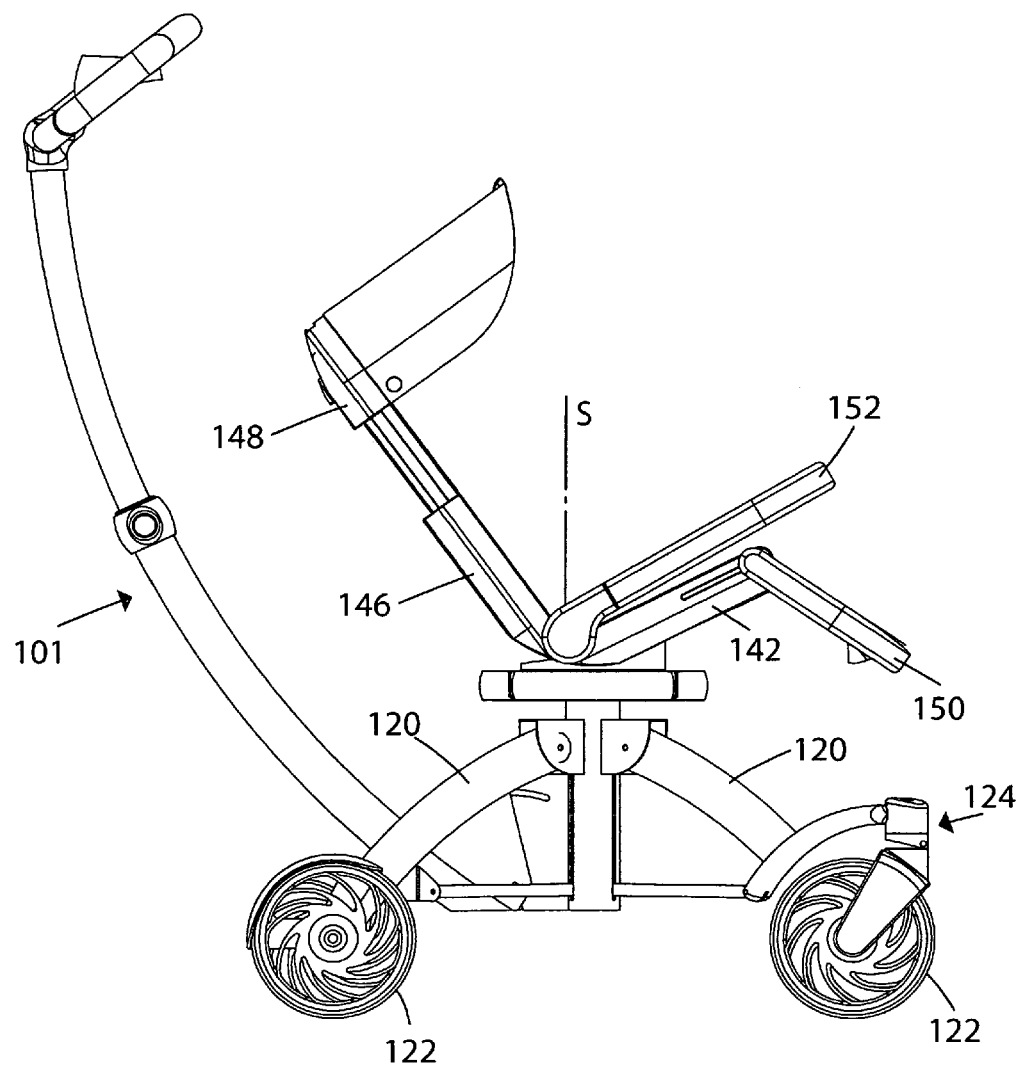
FIG. 13 is a side view of the stroller and seat pod of FIG. 12, with the seat pod partially reclined according to an embodiment of the invention.
Figure 14:
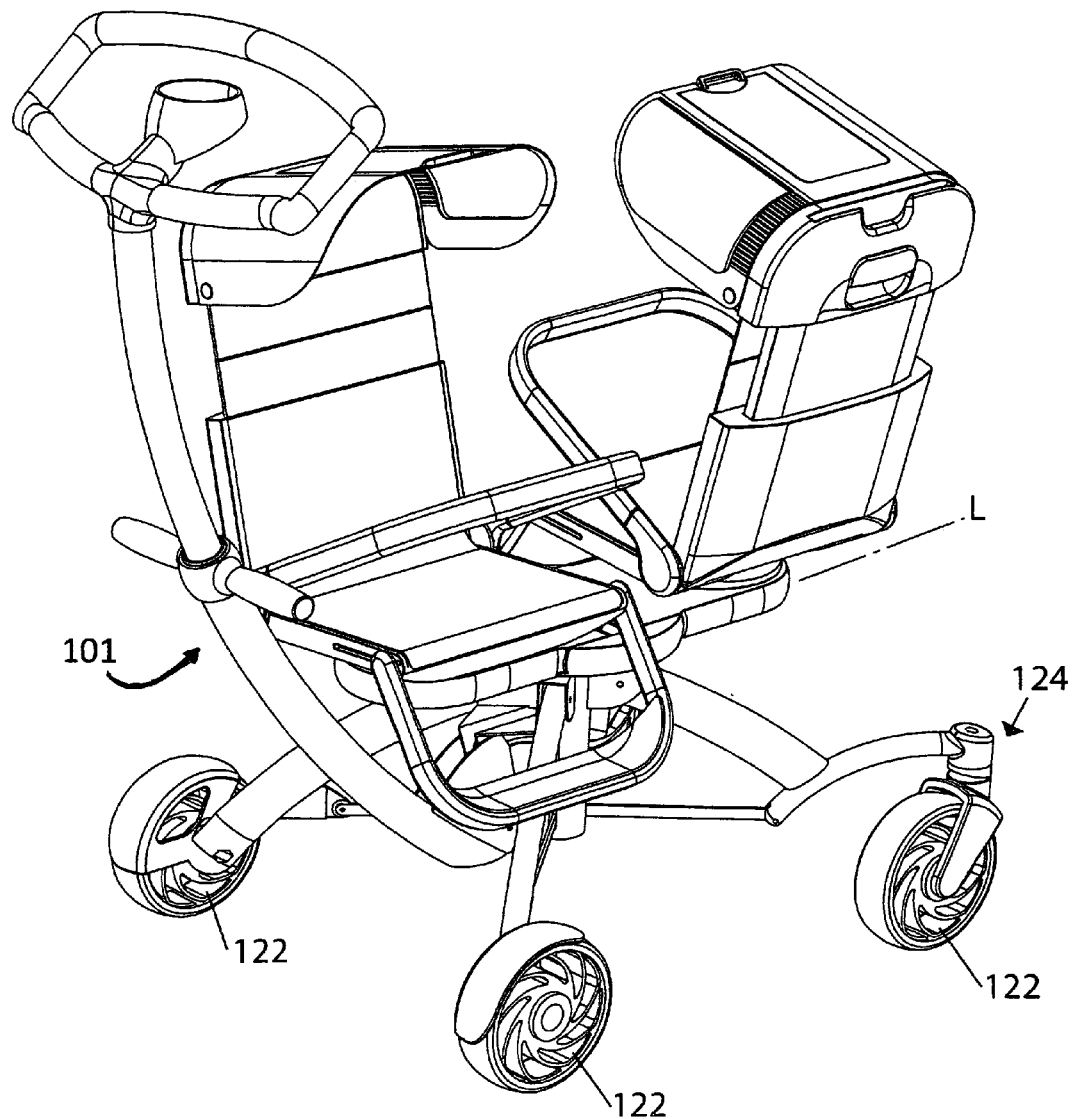
FIG. 14 is a perspective view of the above described stroller with transverse mounted, opposite-facing seat pods according to an embodiment of this invention.

In some embodiments, at least one seat pod 140 having a seat connector 164 is mounted to seat support structure 126. Seat connector 164 may be placed within a space (not shown) of a seat support structure (not shown) and supported for controlled and selectable rotation, about a seat axis. Rotation of the seat is controlled in that user intervention is necessary to rotate the seat about the seat axis. Rotation is selectable in some embodiments in that a locking device (not shown) may be provided to at least temporarily fix the rotational position of the seat pod 140 about the seat axis. The locking device may, in a non-limiting example, arrest rotation of the seat at preselected rotational positions. Further rotation may be prevented by the locking device until some purposeful action is taken to release the seat pod 140 for rotation until the next preselected position is reached. In other embodiments, the locking device may, upon disengaging the device, allow rotation of the seat about the seat axis until a user selected position is reached at which point the seat pod 140 may be fixed in that position. Other methods of temporarily arresting/allowing rotation of the seat would be obvious to the artisan and would be within the scope and spirit of the invention. In FIG. 12, a wheel attachment means 124 is included as part of the stroller. As shown in FIG. 13, there is a connecting support 120 which provides for connection to the wheel attachment means 124. The wheel attachment means 124 connects to wheel 122. As shown in FIG. 14, the wheel 122 may pivot around the axis P.

In some embodiments, seats 140 may include swivel plate 168, swivel plate surface 170, and seat connector 164. At least a portion of the seat swivel surface 174 may be shaped and configured to allow seat pod 140 to swivel into a reclined position as disclosed above and illustrated in FIG. 13. Accordingly, in some embodiments, seat pod 140 may be configured to rotate about axis S and recline along the path determined by the interface of swivel plate surface 170 and seat swivel surface 174. The rotational position about axis S and the swivel position are independent of each other according to some embodiments of this invention.

In some embodiments, the swivel plate surface 170 and the seat swivel surface 174 are shaped and configured to slidably interact such that the center of mass for the seat pod 140 remains approximately aligned with the seat axis S as the seat reclines along the path determined by the interacting surfaces. In other embodiments, the swivel plate surface 170 and the seat swivel surface 174 are shaped and configured to interact such that the center of mass for the seat pod 140 with a seated and properly restrained child remains approximately aligned with the seat axis S as the set reclines along the path determined by interacting surfaces.

According to some embodiments, the inventive stroller may be configured in a plurality of configurations as desired. Configurations comprising two seats are shown here for convenience only. Other configurations of one seat or more than two seats are contemplated and are within the scope and spirit of the disclosure.

Figure 15:
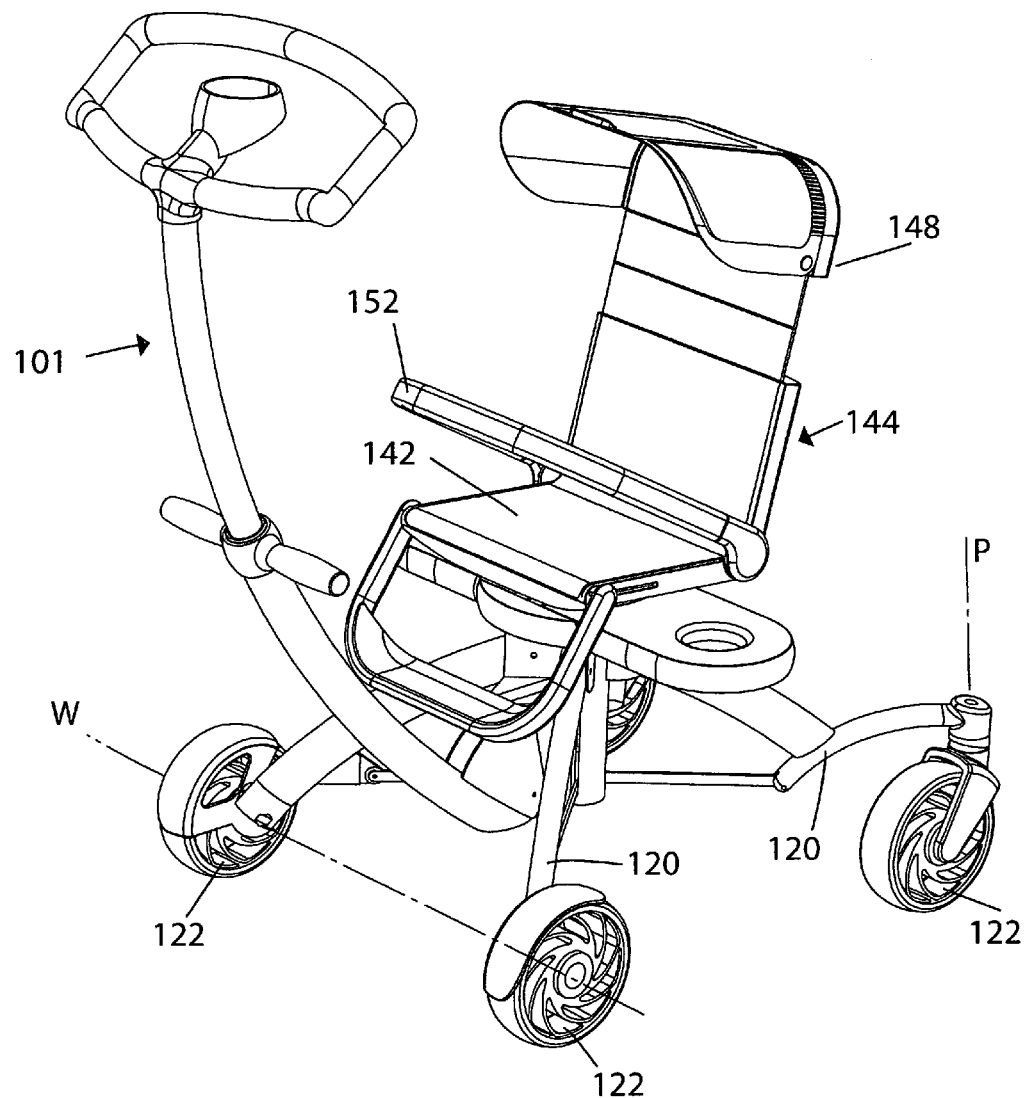
FIG. 15 is a perspective view of the above described stroller with a reversed seat pod according to an embodiment of this invention.
Figure 16:
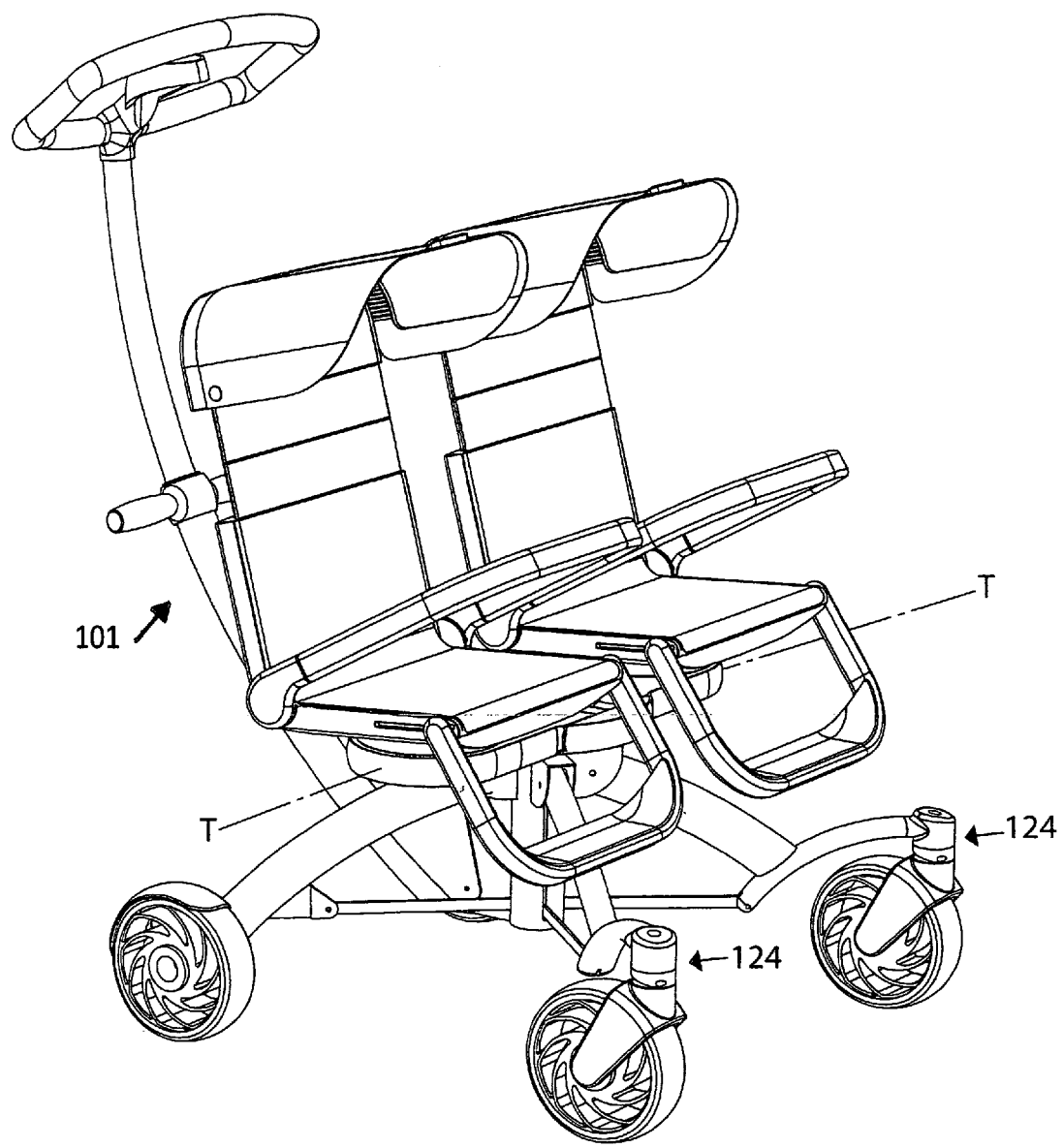
FIG. 16 is a perspective view of the above described stroller with two seats facing forward according to an embodiment of this invention.

Seat support structure 126 may be aligned with the longitudinal axis L (FIG. 14) providing support for two seats 140 along the longitudinal axis L of the stroller frame. Exemplary configurations include two seats 140 transversely mounted oppositely facing on the stroller frame 100 as shown in FIG. 14. FIG. 15 illustrates an embodiment, in which one seat is longitudinally mounted inline, facing rearward. Alternatively, the seat pod 140 of FIG. 16 may be positioned to face forward, aligned with the transverse axis T of the stroller frame.

Figure 17:
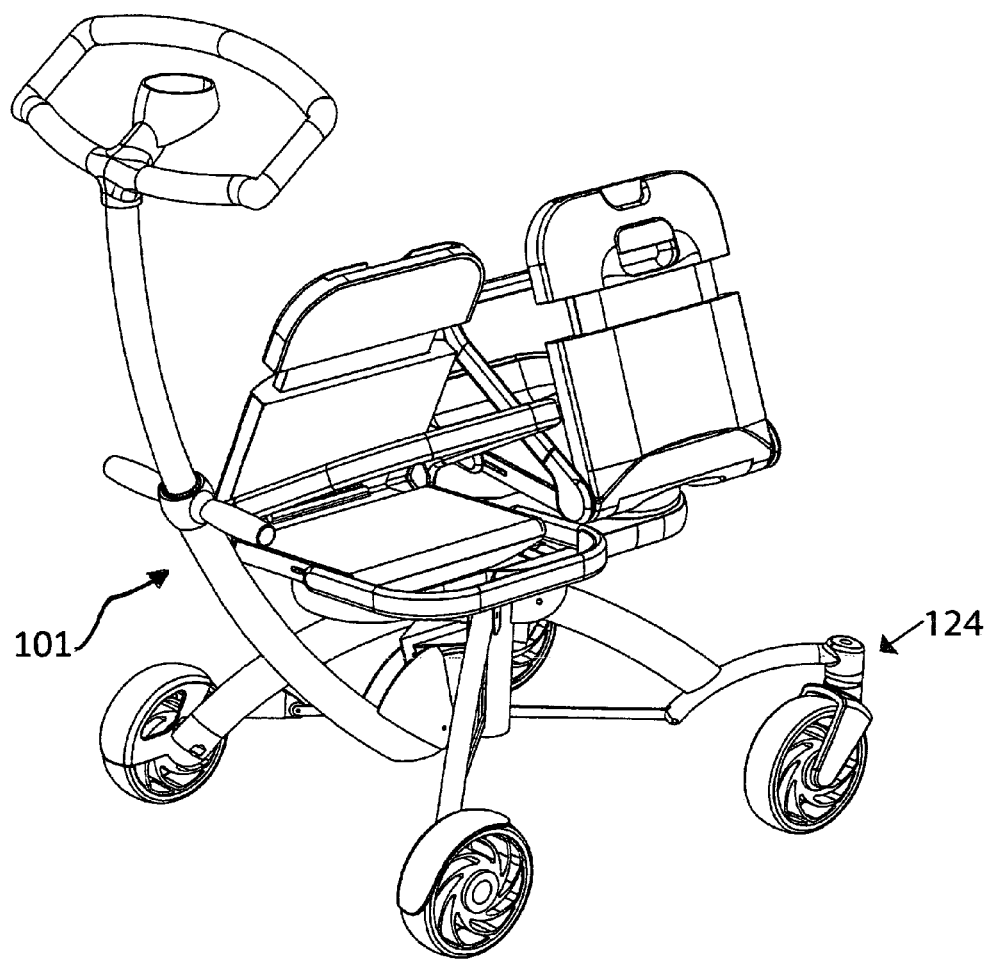
FIG. 17 is a perspective view of a stroller according to an embodiment of the invention with seat facing opposite directions, with the seat pods partially folded.
Figure 18:
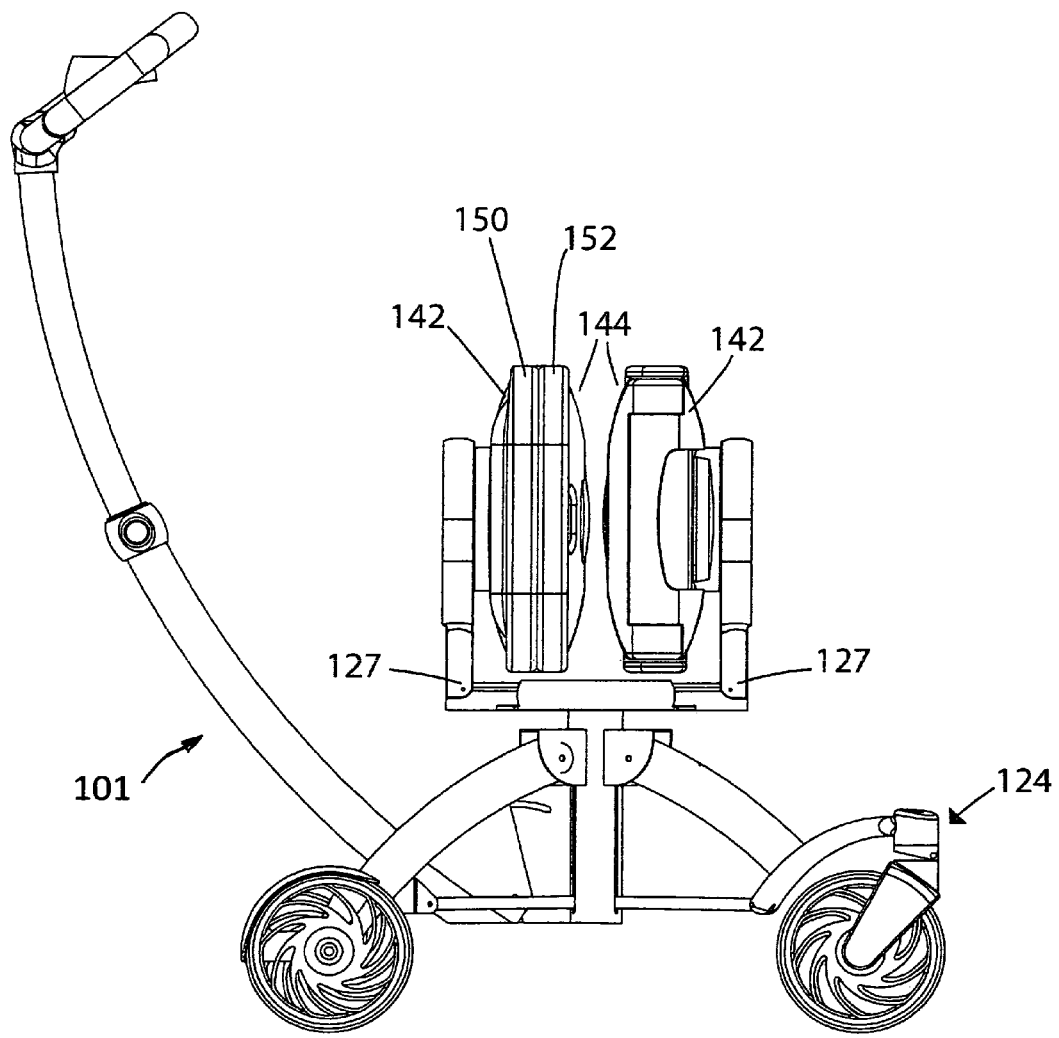
FIG. 18 is a side view of a stroller according to an embodiment of this invention shown in FIG. 17, in a partially folded configuration.
Figure 19:
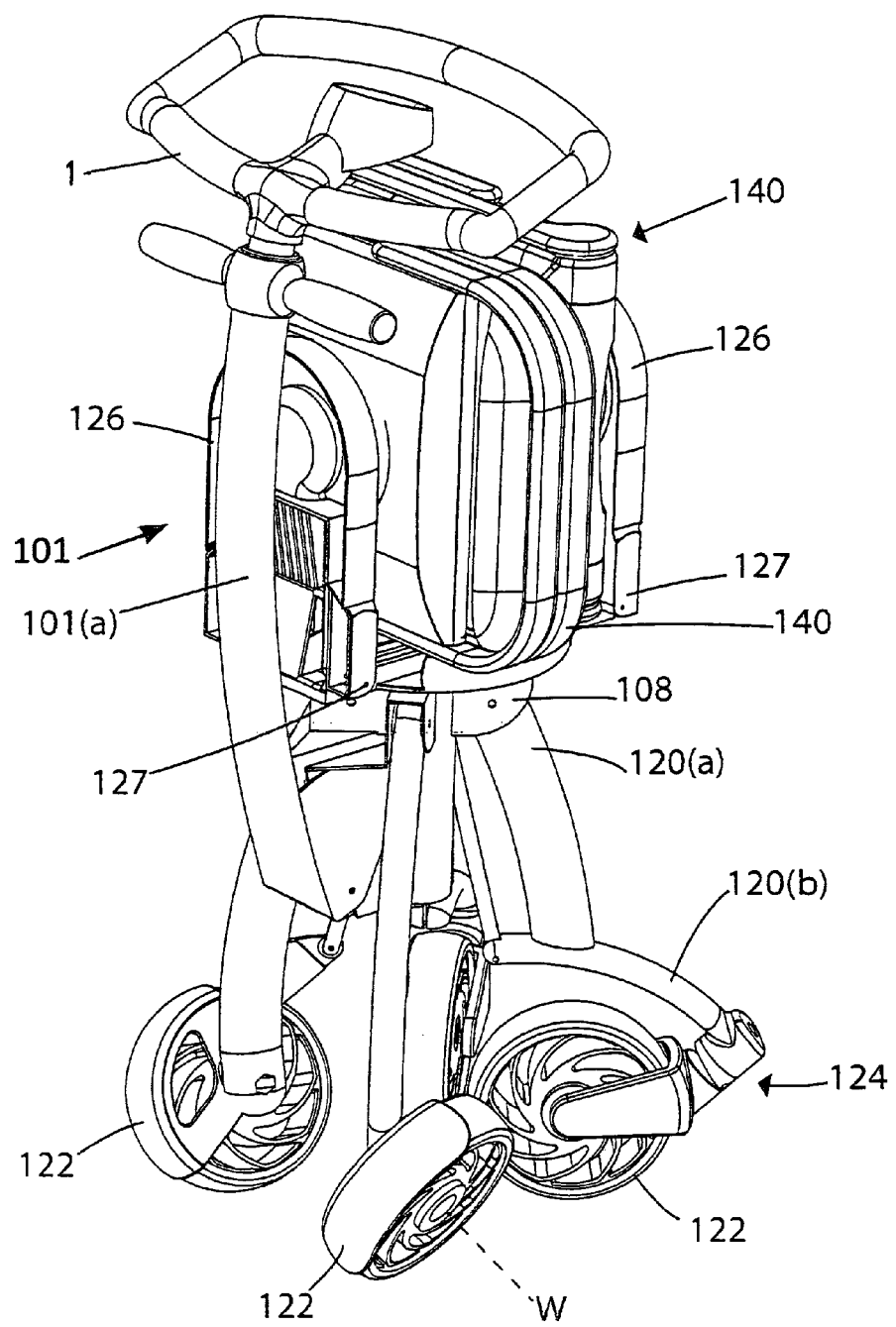
FIG. 19 is a perspective view of a stroller shown in FIGS. 17 and 18, in a fully folded configuration according to an embodiment of the invention.

Aligning seat support structure 126 with the transverse axis T of the stroller frame 100 provides the exemplary starting configuration for folding, as illustrated in FIG. 14. FIGS. 14, 17, 18 and 19 illustrate a double stroller, with non-limiting exemplary seating configurations according to embodiments of the invention. FIG. 14 is, as mentioned, a perspective view of the above described stroller with the two seat pods facing opposite directions according to an embodiment of this invention. FIG. 17 is a perspective view of a stroller and seat pods of FIG. 14 according to an embodiment of the invention with seat pods facing opposite directions and with the seat pods partially folded. FIG. 18 is a side view of a stroller according to an embodiment of this invention shown in FIG. 17, in a partially folded configuration. And FIG. 19 is a perspective view of a stroller shown in FIGS. 16, 17 and 18, in a fully folded configuration according to an embodiment of the invention.

In these Figures, a stroller frame 101 with one or more seats 140 mounted thereto is collapsible upon activation of the collapsing mechanism discussed above. To facilitate collapsing the stroller, seats 140 can be folded into a storage position as shown in FIG. 19. To facilitate the folding of an embodiment of the stroller frame 101 with seats 140 mounted thereon, the seats 140 may be folded as shown in FIGS. 17 and 18. A seat folded as shown has a seat bottom 142 oriented substantially parallel to seat back 144. As shown, the seat bottom 142 and the seat back 144 are parallel and vertically oriented in FIG. 19. The footrest 150 may be withdrawn against the seat bottom 142 as previously described. Seats 140 folded as shown and described present the seat bottom 142 and seat back 144 as exposed external surfaces with the seating surfaces within the external surfaces.

To further facilitate the folding of the stroller with one or more seats 140, in some embodiments, a seat support structure 126 comprising pivots 127 may fold along a common pivot line. Folded thus, at least part of the seat back 144 is aligned substantially vertically and facing inward, toward the central shaft 102.

As the collapsing mechanism is activated, the leg second ends 120(b) are drawn inward, toward the central shaft 102 by stretchers (not shown), causing leg first ends 120(a) to pivot about the axis provided in the associated leg flange 108. As leg second ends 120(b) are drawn inward, the axis of at least some of the wheel assemblies 122 is canted away from the initial horizontal orientation (line L of FIG. 14) to a non-horizontal orientation. In folded configuration as illustrated in FIG. 13, the canted wheel axis W prevents the wheel assemblies 122 from rotating about their axis W. A latching mechanism may be provided within the collapsing mechanism to constrain the legs 120 from unintended movement from the collapsed position.

According to some embodiments of the invention, an upper or lower handle section may be withdrawn into the other of the upper and lower handle portion for storage. A fully collapsed stroller frame, handle 1, and present invention seat pods 140 as illustrated in FIG. 19 may occupy a volume as small as approximately 16.5"×16.5"×40.1" for storage or transport.

Figure 20:
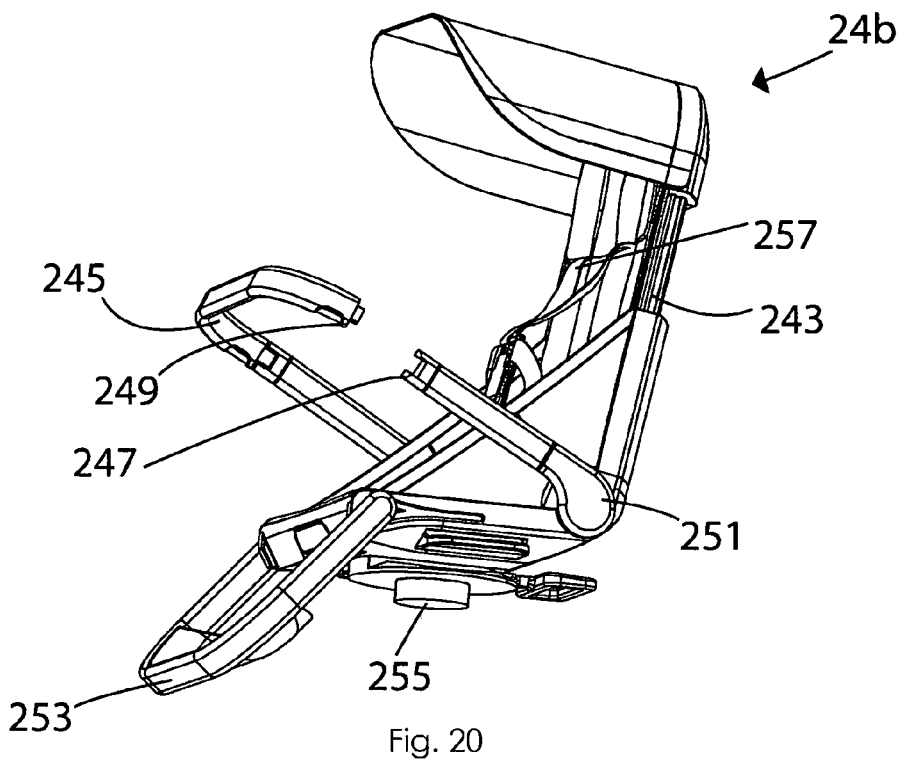
FIG. 20 is a perspective view of a removable stroller seat in accordance with an embodiment of the present invention.

FIG. 20 is a perspective view of a removable stroller seat pod 24b. It includes a two piece articulated back, with a backrest and a headrest telescopically connected via track 243. It has a safety harness 257 and a snap-type safety bar 245, with snap 249, snap receiver 247 and hinge points, such as hinge point 251. There is also a footrest 253 and a connector 255 for attachment to a stroller, highchair or other base member.

Figure 21:
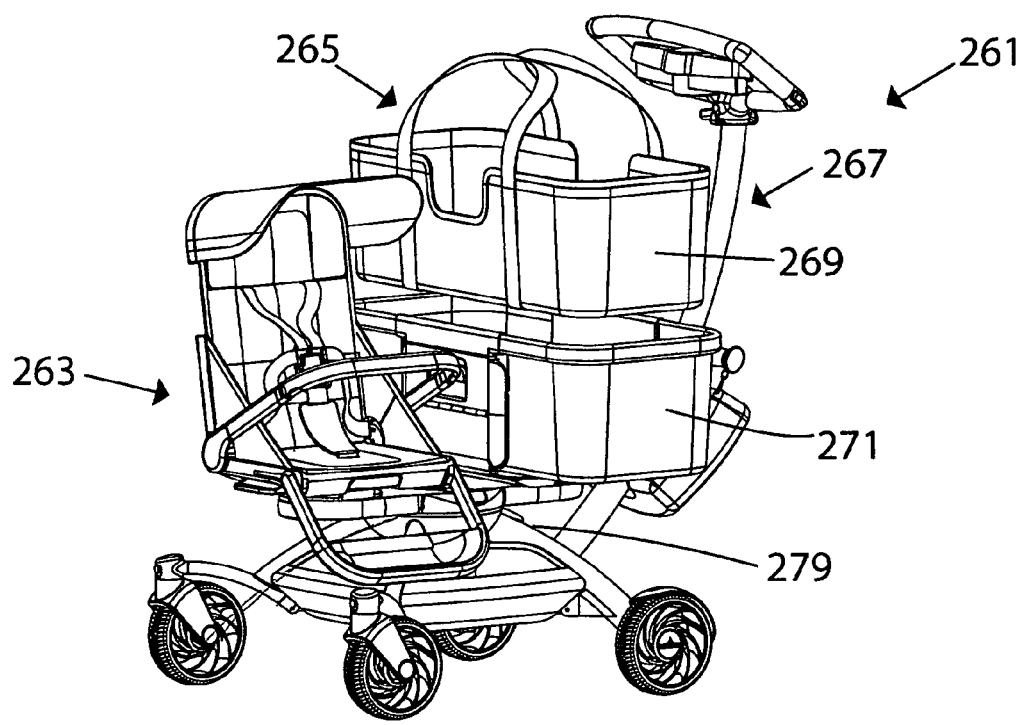
FIG. 21 is a stroller in accordance with the present invention seat pod that includes the removable seat pod of FIG. 20 and a plurality of collapsible containers that may be used for shopping or otherwise.

FIG. 21 illustrates a stroller system 261 with a stroller 267 of the types described above, and with the present invention removable seat pod 263 in the front position, but facing to one side. The stroller base 279 is collapsible. In the rear position are stacked containers 265 and 271. These may be bassinettes, shopping bags or otherwise. They may be collapsible and have cloth or other flexible sides such as side 269 to facilitate easy and compact collapsing and storage.

Figure 22:
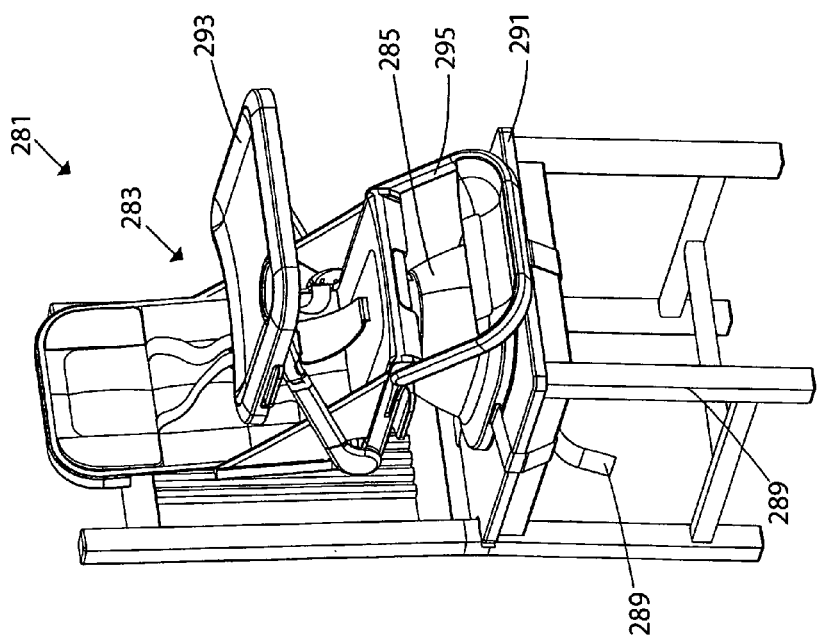
FIG. 22 illustrates a present invention seat pod attached to a chair support; and, FIG. 23 illustrates a present invention seat pod attached to a highchair base.

FIG. 22 illustrates a seat pod system 281 with a present invention seat pod 283 attached to a chair support 285. The seat pod 283 has a removable tray 293 attached to the safety bar and the support 285 lockably receives the underside connecter of the seat pod 283, and is strapped by or otherwise safely attached to chair 291. A strap means 289 straps the chair 291 and the seat pod 283. A foot rest 295 is attached to the base of the seat pod 283. This same present invention pod may be utilized in an automobile, on a stroller base, on a highchair base or otherwise.

Figure 23:
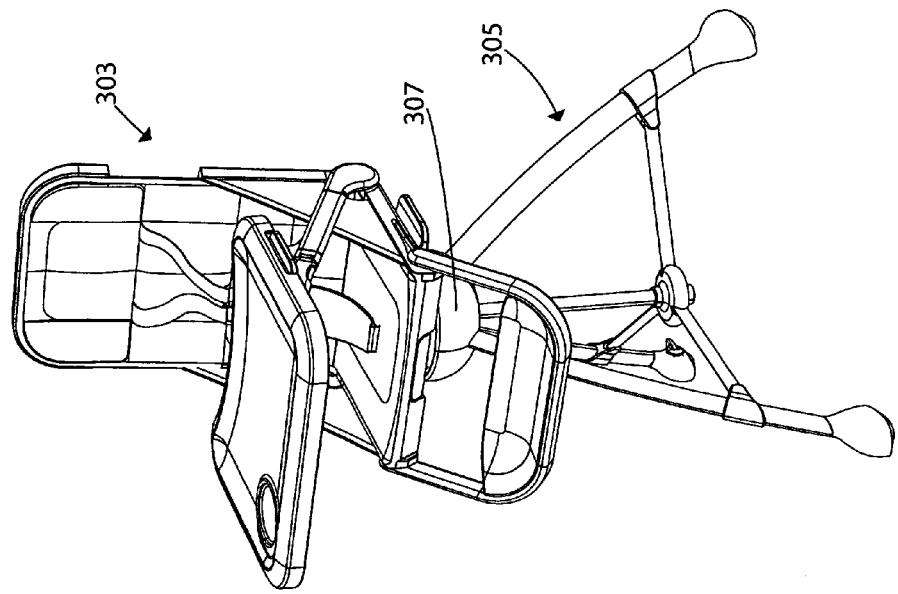

FIG. 23 illustrates a present invention seat pod 303 attached to a highchair 305 at its base 307, as shown. The underside connector (not shown) may be attached in the same manner as the above-described strollers.

Although particular embodiments of the invention have been described in detail hereinwith reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A stroller seat pod comprising: a seat bottom having a front, a left side, a right side, a back, a top, and an underside; a seat back having a first piece and a second piece, said first piece and said second piece slidably connected to one another; said first piece of said seat back being hingedly connected to said seat bottom such that said seat back and said seat bottom have a first seat position and a second seat position, wherein, in said first seat position, said seat back and said seat bottom have an open configuration for sitting, and wherein, in said second seat position, said seat back and said seat bottom have a closed configuration for storage; said second piece of said seat back being connected to said first piece of said seat back such that said first piece of said seat back and said second piece of said seat back have a first backrest position and a second backrest position, wherein, in said first backrest position, said first piece of said seat back and said second piece of said seat back are extended relative to one another to increase seat back area for sitting, wherein, in said second backrest position, said first piece of said seat back and said second piece of said seat back are retracted relative to one another for storage; and, at least one footrest depending from said seat bottom such that said at least one footrest and said seat bottom have a first footrest position and a second footrest position, wherein, in said first footrest position, said at least one footrest is extended away from said seat bottom for use as a footrest during sitting, wherein, in said second footrest position, said at least one footrest is retracted toward said seat bottom for storage.

2. The stroller seat pod of claim 1 further comprises a canopy removably connected to said second piece of said seat back.

3. The stroller seat pod of claim 1 further comprising: a canopy retractably connected to said second piece of said seat back.

4. The stroller seat pod of claim 1 further comprising: A first locking mechanism adapted to hold said seat bottom and said seat back in either said first seat position or said second seat position; A second locking mechanism adapted to hold said first piece of said seat back and said second piece of said seat back in either said first backrest position or said second backrest position; and A third locking mechanism adapted to hold said at least one footrest and said seat bottom in either said first footrest position or said second footrest position.

5. The stroller seat pod of claim 1 wherein, in said first seat position, said seat bottom and said seat back form an angle between 1 and 180 degrees and wherein said seat bottom and said seat back are connected at rotation means and wherein said seat bottom and said seat back rotate relative to each other through said rotation means.

6. The stroller seat pod of claim 1 wherein, in said first seat position, said seat bottom and said seat back form an angle between 1 and 180 degrees and wherein said seat bottom and said seat back are connected at rotation means and wherein said seat bottom and said seat back rotate relative to each other through said rotation means.

7. The stroller seat pod of claim 1 wherein said at least one footrest is functionally connected to said seat back, such that as said seat back and said seat bottom move from said first seat position to said second seat position, said at least one footrest and said seat bottom move from said first footrest position to said second footrest position.

8. The stroller seat pod of claim 1 further comprising a safety bar having at least two sections and being hingedly connected to said seat bottom and one section being connected to at least one other section, said safety bar having a first safety bar position, a second safety bar position, and at least a third safety bar position, wherein, in said first safety bar position, said safety bar is extended away from said seat bottom for restraint, and wherein, in said second safety bar position, said safety bar is retracted toward said seat bottom for storage.

9. The stroller seat pod of claim 8 wherein: said seat bottom in said second seat position has a top-view footprint, said top-view footprint of said seat bottom having an outer edge; said safety bar has a top-view footprint, said top-view footprint of said safety bar having an inner edge; and said inner edge of said top-view footprint of said safety bar extends beyond said outer edge of said top-view footprint of said seat bottom in said second seat position.

10. The stroller seat pod of claim 1 further comprising a safety bar hingedly connected to said seat back, said safety bar having a first safety bar position and a second safety bar position, wherein, in said first safety bar position, said safety bar is extended away from said seat back for restraint, and wherein, in said second safety bar position, said safety bar is retracted toward said seat back for storage.

11. The stroller seat pod of claim 10 wherein: said seat back in said second seat position has a top-view footprint, said top-view footprint of said seat back having an outer edge; said safety bar has a top-view footprint, said top-view footprint of said safety bar having an inner edge; and said inner edge of said top-view footprint of said safety bar extends beyond said outer edge of said top-view footprint of said seat back in said second seat position.

12. A stroller seat pod comprising: a seat bottom having a front, a left side, a right side, a back, a top, and an underside; a seat back having a first piece and a second piece, said first piece and said second piece slidably connected to one another; said first piece of said seat back being hingedly connected to said seat bottom such that said seat back and said seat bottom have a first seat position and a second seat position, wherein, in said first seat position, said seat back and said seat bottom have an open configuration for sitting, and wherein, in said second seat position, said seat back and said seat bottom have a closed configuration for storage; said second piece of said seat back being connected to said first piece of said seat back such that said first piece of said seat back and said second piece of said seat back have a first backrest position and a second backrest position, wherein, in said first backrest position, said first piece of said seat back and said second piece of said seat back are extended relative to one another to increase seat back area for sitting, wherein, in said second backrest position, said first piece of said seat back and said second piece of said seat back are retracted relative to one another for storage; at least one footrest depending from said seat bottom such that said at least one footrest and said seat bottom have a first footrest position and a second footrest position, wherein, in said first footrest position, said at least one footrest is extended away from said seat bottom for use as a footrest during sitting, wherein, in said second footrest position, said at least one footrest is retracted toward said seat bottom for storage; and, a seat connector connected to said underside of said seat bottom.

13. The stroller seat pod of claim 12 further comprising a canopy retractably connected to said second piece of said seat back.

14. The stroller seat pod of claim 12 further comprising a safety bar hingedly connected to said seat bottom, said safety bar having a first safety bar position and a second safety bar position, wherein, in said first safety bar position, said safety bar is extended away from said seat bottom for restraint, and wherein, in said second safety bar position, said safety bar is retracted toward said seat bottom for storage.

15. The stroller seat pod of claim 12 further comprising a safety bar hingedly connected to said seat back, said safety bar having a first safety bar position and a second safety bar position, wherein, in said first safety bar position, said safety bar is extended away from said seat back for restraint, and wherein, in said second safety bar position, said safety bar is retracted toward said seat back for storage.

16. The stroller seat pod of claim 12 further comprising a canopy removably connected to said second piece of said seat back.

17. The stroller seat pod of claim 12 wherein said at least one footrest is functionally connected to said seat back, such that as said seat back and said seat bottom move from said first seat position to said second seat position, said at least one footrest and said seat bottom move from said first footrest position to said second footrest position.

18. The stroller seat pod of claim 12 further comprising: A first locking mechanism adapted to hold said seat bottom and said seat back in either said first seat position or said second seat position; a second locking mechanism adapted to hold said first piece of said seat back and said second piece of said seat back in either said first backrest position or said second backrest position; and a third locking mechanism adapted to hold said at least one footrest and said seat bottom in either said first footrest position or said second footrest position.

19. The stroller seat pod of claim 12 further comprising: a swivel plate attached to said seat connector, said swivel plate having a first swivel position and a second swivel position wherein, in said first swivel position, said seat connector is substantially perpendicular to said seat bottom, wherein in said second swivel position said seat connector is not substantially perpendicular to said seat bottom; a seat swivel surface on the underside of said seat bottom; a swivel plate surface attached to said swivel plate, said swivel plate surface shaped to closely engage said seat swivel surface; and a friction modifying surface applied to said swivel plate surface.

20. The stroller seat pod of claim 19 further comprising a locking mechanism, said locking mechanism adapted to releasably lock said swivel plate in a position relative to said seat bottom.

* * * * *